(12) United States Patent
Aldrich et al.

(10) Patent No.: US 7,401,295 B2
(45) Date of Patent: Jul. 15, 2008

(54) COMPUTER-BASED LEARNING SYSTEM

(75) Inventors: Clark Aldrich, Madison, CT (US); Ken Kupersmith, Wilton, CT (US)

(73) Assignee: Simulearn, Inc., Norwalk, CT (US)

( * ) Notice: Subject to any disclaimer, the term of this patent is extended or adjusted under 35 U.S.C. 154(b) by 811 days.

(21) Appl. No.: 10/641,748

(22) Filed: Aug. 15, 2003

(65) Prior Publication Data

US 2004/0103148 A1 May 27, 2004

(51) Int. Cl.
*G06F 3/00* (2006.01)
(52) U.S. Cl. .................................. 715/758; 715/753
(58) Field of Classification Search ................ 715/753, 715/758, 757, 706, 715
See application file for complete search history.

(56) References Cited

U.S. PATENT DOCUMENTS

| | | | |
|---|---|---|---|
| 5,347,306 A | 9/1994 | Nitta | |
| 5,358,259 A | 10/1994 | Best | |
| 5,393,070 A | 2/1995 | Best | |
| 5,393,071 A | 2/1995 | Best | |
| 5,491,743 A | 2/1996 | Shiio et al. | |
| 5,498,003 A | 3/1996 | Gechter | |
| 5,682,469 A | 10/1997 | Linnett et al. | |
| 5,767,855 A | 6/1998 | Bardon et al. | |
| 5,880,731 A | 3/1999 | Liles et al. | |
| 5,894,307 A * | 4/1999 | Ohno et al. .................. 715/757 |
| 5,982,390 A | 11/1999 | Stoneking et al. | |
| 5,999,208 A * | 12/1999 | McNerney et al. ....... 348/14.08 |
| 6,106,399 A | 8/2000 | Baker et al. | |
| 6,159,100 A | 12/2000 | Smith | |
| 6,226,669 B1 | 5/2001 | Huang | |
| 6,234,802 B1 | 5/2001 | Pella et al. | |
| 6,296,487 B1 | 10/2001 | Lotecka | |
| 6,388,665 B1 | 5/2002 | Lotecka | |
| 6,559,863 B1 * | 5/2003 | Megiddo ..................... 715/753 |
| 6,784,901 B1 * | 8/2004 | Harvey et al. ............... 715/757 |
| 6,941,515 B1 * | 9/2005 | Wilkins ....................... 715/719 |
| 2003/0169303 A1 * | 9/2003 | Islam et al. .................. 345/836 |

* cited by examiner

*Primary Examiner*—Kieu D. Vu
(74) *Attorney, Agent, or Firm*—Kelley Drye & Warren LLP

(57) ABSTRACT

The present invention enables a user to develop his/her leadership skills by participating in virtual business meetings with animated characters. The animated characters are managers and/or employees who work for the user in a fictitious corporation. Utilizing real-time animation and an advanced artificial intelligence and physics system, the software program enables the user to introduce, support, and oppose ideas and characters during virtual meetings. The logic of the program is built around a novel three-to-one leadership methodology. The user may participate in a number of meetings—each meeting configured to build upon the prior meeting. The user's progress is measured by metrics that graph various aspects of the user's and the animated characters' activity during each meeting based upon the three-to-one leadership methodology and provide a story-line continuation based upon the outcome of each meeting.

7 Claims, 18 Drawing Sheets

|    |    |   | C3 Power | | C4 Ideas | | C5 Tension | | C6 Work | | C7 Reactive | | C8 |
|----|----|---|---|---|---|---|---|---|---|---|---|---|---|
| C1 | C2 |   | Without formal authority, partner with someone who is supporting a favored idea (C3-1) | (C3-2 thru n) | Too few ideas known, bring in disengaged (C4-1) | (C4-2 thru n) | Tension too low, be more extreme in all positions (C5-1) | (C5-2 thru n) | Too few ideas finished, finish an idea which is almost finished (C6-1) | (C6-2 thru n) | Too tense, withdraw (C7-1) | (C7-2 thru n) | Total |
| L1 |    |   | 10 points | ... | 5 points | ... | 20 points | ... | 10 points | ... | 15 points | ... |   |
| L2 |    |   |           |     |          |     |           |     |           |     |           |     |   |
| L3 |    |   |           |     |          |     |           |     |           |     |           |     |   |
| L4 Idea 1 | S |   | 10 | ... | -- | ... | 20 | ... | 10 | ... | 15 | ... | 130 |
|           | O |   | -- | ... | 5  | ... | 20 | ... | -- | ... | -- | ... | 50  |
| L5 ... |   |   |    |     |    |     |    |     |    |     |    |     |     |
| L6 Idea n | S |   | 10 | ... | -- | ... | -- | ... | -- | ... | 15 | ... | 80  |
|           | O |   | -- | ... | 5  | ... | 20 | ... | 10 | ... | -- | ... | 125 |
| L7 Chara. 1 | S |   | 10 | ... | 5  | ... | -- | ... | -- | ... | 15 | ... | 85 |
|             | O |   | -- | ... | -- | ... | 20 | ... | 10 | ... | -- | ... | 105 |
| L8 ... |   |   |    |     |    |     |    |     |    |     |    |     |     |
| L9 Chara. n | S |   | -- | ... | -- | ... | 20 | ... | -- | ... | -- | ... | 65 |
|             | O |   | 10 | ... | 5  | ... | -- | ... | 10 | ... | 15 | ... | 55 |

Fig. 13

After The Meeting

You walk out the room with a new sense of priorities and purpose. The next year at Nortic is full of challenges and surprises. But nothing prepares you completely for what happens next.

The Financial Impact

While you have often been considered to have more businesses put under your control, your fiscal recklessness has prevented you from making any real progress.

The Effect on Customer Satisfaction

You had volunteered to be part of a customer improvement board, but your comments were ignored, and over time you were edged out for your perceived lack of commitment.

The Effect on Employee Satisfaction

Your employees treat you with hostility, sometimes openly ignoring you. You were once censured by your peers for berating an employee in the cafeteria.

Fig. 17

COMPUTER-BASED LEARNING SYSTEM

BACKGROUND OF THE INVENTION

1. Field of the Invention

The present invention relates generally to a computer-based simulation learning system that enables a user to interact with computer-generated characters to learn leadership skills and, more particularly, for a computer-based learning system wherein a user's leadership skills are developed through communicating with computer-generated characters by verbal and physical (body language) communication.

2. Background of the Related Art

Leadership training traditionally depended on a teacher/student model where the teacher instructs students from the front of a classroom on the do's and don'ts of leadership, walks students through roll-playing scenarios, and provides a short test to determine whether the students absorbed any of the information disseminated during the training session.

The traditional method has its merits, however, it has a number of drawbacks as well. One drawback is that teachers tend to take a purely pedagogical approach, pontificating on the rules of leadership, and spend little if any time on implementing the lessons they teach. Another drawback is that providing such leadership training requires the expenditure of a significant amount of resources, including the cost of the teacher and the time managers spend away from their jobs to attend training. Yet another drawback is that it is difficult via the traditional method to provide uniform training to a large number of individuals, such as that found in medium to large corporations.

The ubiquitous nature of computer systems in industry has prompted a number of software developers to create computer-based learning systems that attempt to address the deficiencies of traditional leadership training. Examples of such systems are sold by Ninth House Network (San Francisco, Calif.) and Imparta Ltd. (London, UK). In Ninth House's system, video-based simulations play out like TV dramas. Following a brief video to set the stage, users are asked to choose from a series of responses that direct a course of action, made possible by a technique known as branching video. An advantage of these computer-based systems is that they are more accessible to larger numbers of managers since you only need a desktop computer system to use them. A significant disadvantage is that such systems provide little more than high-end video instruction resulting in a lack of user interactivity, that is, the user becomes more of an observer and less of a participant in the learning experience.

There are prior-art computer systems that have attempted to simulate user/computer-animated character interactivity, however, they are not directed toward teaching leadership skills. Furthermore, the prior-art computer systems are intended to reproduce user activity (e.g., create computer-animated character versions of participants in a chat session), or inadequately attempt to provide a computer-animated character that can interact with a user. Examples of such prior-art computer systems follow.

U.S. Pat. No. 5,498,003, to Gechter, discloses an interactive, electronic game apparatus for playing a game in which game characters appearing on a display are responsive to inputs from a game user. The apparatus includes a visual display presenting an observable state of the game and of the game characters to the game user in response to a display signal; an input device for interactively entering user input signals representative of user interaction with game characters; and processing means receiving the user input signals from the input device and generating the display signal and outputting the display signal to the visual display.

The processing means includes an extensible plurality of independent character behavior controllers for determining the behavior of respective game characters, each character behavior controller containing independent behavior logic to determine states and state transitions of its respective game character as represented to the user by the display means. The character behavior controllers are responsive to the user input signals and to game control signals for adjusting the behavior of the respective game characters. The apparatus also includes a game controller for coordinating the behavior of the game characters. The game controller contains logic to determine consistent game states for the game and the characters, and transmit game control signals to the character behavior controllers so that the state of the game and of the game characters is a consistent game state. The apparatus also includes an operating application for operation of the character behavior controllers and the game controller on the processing means. Each character behavior controller includes an independent dynamically-linked procedure invoked by the operating application. The game controller includes logic to add new character behavior controllers to the game.

U.S. Pat. No. 5,880,731, to Liles et al., discloses a system using avatars to represent participants in a graphic chat session that are periodically animated to produce a gesture that conveys an emotion, action, or personality trait. Each participant in the chat session is enabled to select one of a plurality of different avatars to represent the participant in a graphic chat session. Associated with each avatar is a bitmap file that includes a plurality of frames illustrating the avatar in different poses, actions, and emotional states. Selected frames are displayed in rapid sequence in accord with a script file to create an animation effecting each gesture. The same script file is used to define a gesture for all of the avatars used in the chat session. A selected gesture can be transmitted with a text message to convey the user's emotional state. A gesture associated with the avatar is automatically displayed from time to time when the avatar is not otherwise gesturing or moving. The user can determine participants in the chat session with whom the user will interact, e.g., by defining a proximity radius around the user's avatar or by selecting the specific participants from a list. Avatars of participants that are outside the proximity radius (or otherwise not selected) and messages received from them are not displayed on the user's monitor.

U.S. Pat. No. 5,347,306, to Nitta, discloses a network-based animated electronic meeting place for business meetings, education, simulated classrooms, casual encounters, personal meetings, art auctions, parties and game playing, which includes a terminal for each participant on the network and local pre-stored animation graphics, with simulated participants in the form of animated characters or dolls being driven through sensing of each of the participants at their respective work stations, including their position, posture, gestures, audio content and optionally that persona which each individual wishes to be displayed at the animated electronic meeting place. In one embodiment, a user chooses how he represents himself on the screen through the use of a persona or character control. The animated electronic meeting place is provided with real time 3-D graphics renderings, showing the meeting with all of the participants including the individual participant as himself, a microphone to capture the user's speech, digital sound processing for voice localization, and position sensors to detect the participant's gestures and/or facial expressions as well as body movement.

U.S. Pat. No. 5,491,743, to Shiio et al., discloses a terminal apparatus for a virtual conference system including a display means for displaying a virtual conference room used for holding a virtual conference and for displaying, in the virtual conference room, animated characters representing attendants at the virtual conference; an indication means for indicating an action of an animated character representing the user; an information output means for outputting action information for the animated character representing the user indicated by the indication means; and character control means for actuating the other animated characters in accordance with input action information for the other animated characters, and for actuating the animated character representing the user in accordance with the indicated action.

What is needed is a learning system that takes advantage of the ubiquitous nature of computer systems so that the learning system can be made available to a large number of users. In addition, a learning system is needed that provides users with a high level of interactivity so that roll-playing remains a part of the learning experience. The learning system should provide real-time feedback to users and a real-life learning experience.

BRIEF DESCRIPTION OF THE DRAWINGS

So that those of ordinary skill in the art to which the subject invention pertains will more readily understand how to make and use the system described herein, embodiments of the invention will be described in detail with reference to the following figures.

FIG. 13 is a table for illustrating the functionality of an exemplary micro-strategy system, which forms a part of an artificial intelligence system;

FIG. 17 is a screen shot of an exemplary story-line continuation of a virtual meeting reflecting the results of the meeting based on ideas that were passed.

Figure 1:
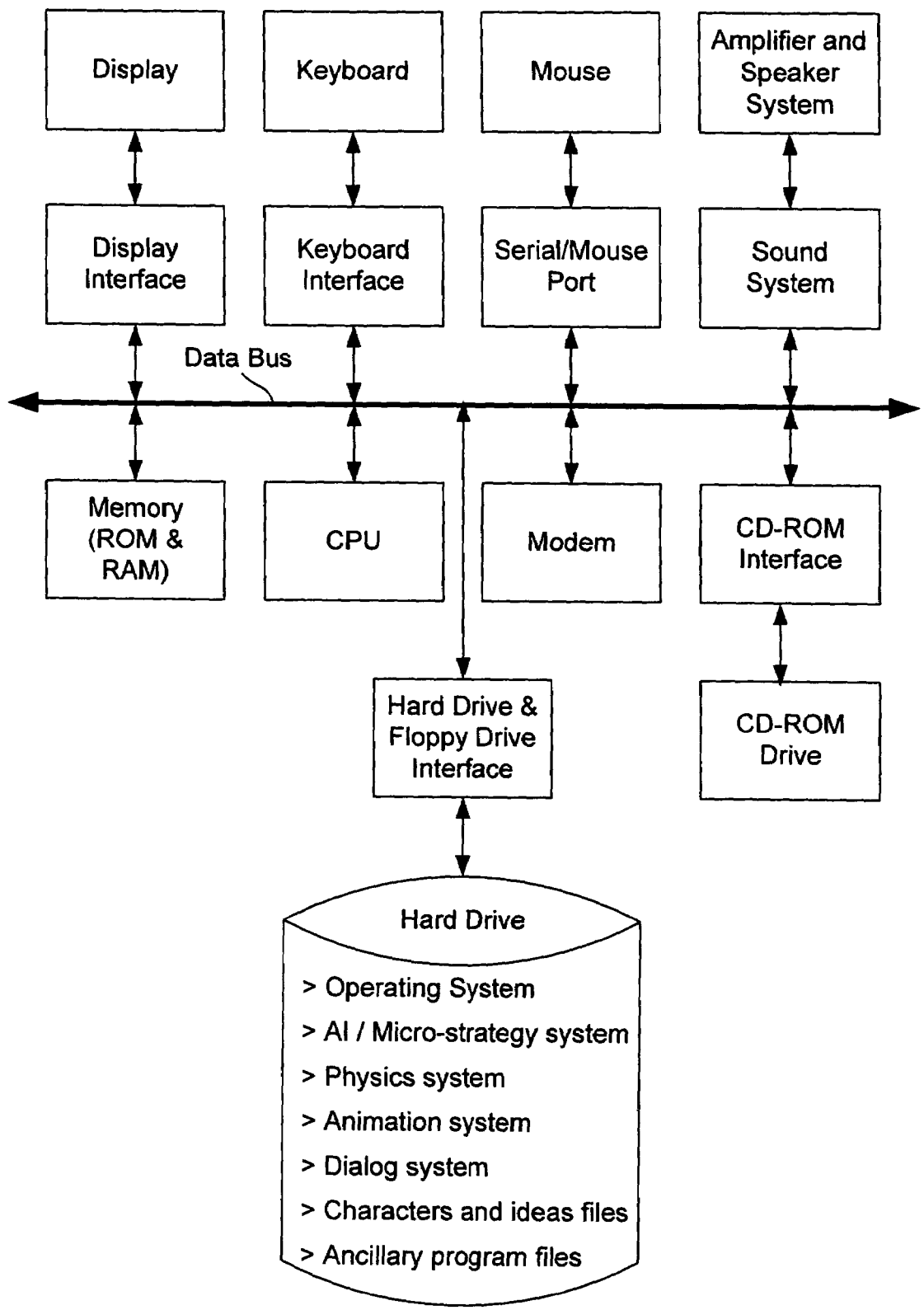
FIG. 1 is a block diagram of an exemplary computer system on which of the present invention may be installed and used by a user.

These and other features of the system disclosed herein will become more readily apparent from the following detailed description of the embodiments taken in conjunction with the figures.

DETAILED DESCRIPTION OF PREFERRED EMBODIMENTS

Reference is now made to the accompanying figures for the purpose of describing, in detail, embodiments of the present invention. The figures and accompanying detailed description are provided as examples of the invention and are not intended to limit the scope of the claims appended hereto.

The present invention provides a novel system and method for a user to learn business and interpersonal skills. Unlike prior art computer-based learning systems that basically guide a user though preformatted lesson plans using, in large part, branching video techniques or still-form slides, the present invention enables a user to interact with animated characters in real time to develop business and interpersonal skills. In addition, the present invention includes a unique interface that enables a user to more naturally interact with the animated characters. Further, the animated characters of the present invention are animated using a novel artificial intelligence ("AI") system and physics system. Furthermore, at the end of a virtual meeting a user is provided meaningful feedback, thereby enabling the user to more accurately gauge his strengths and weaknesses.

Those skilled in the art will appreciate that other business and interpersonal skill teaching programs can be used to train users and that the teaching program described herein is used to exemplify, and not limit, the capability of the present invention. As an example, the present invention may be adopted to facilitate the teaching of other leadership leaning systems. In addition, the present invention may be adopted to facilitate the training of individuals in fields other than in a business setting. For example, the present invention may be adopted to facilitate the training of firefighters, hostage negotiators, and military personal to develop and improve their respective leadership skills.

In general, the present invention includes at least a novel user interface, artificial intelligence system, and physics system that exercise a user's leadership. Although many factors influence a person's relationship with others and the ability to complete work, the present invention is built around an exemplary three-to-one leadership program. The leadership program utilizes the basic concepts of power, tension, and ideas to facilitate focusing on the right work that is to be carried out by a fictitious company. A general description of the leadership program is introduced below to facilitate a better understanding of the present invention.

The first of the three concepts is power or influence. When people with power speak, others listen. When they support ideas, others support the ideas. They exemplify credibility to their position and partners. Three primary forms of power are formal authority (e.g., a persons position within an organization), a group's opinion within an organization of an individual, and personal influence (e.g., power derived from intuition and vision). Techniques for acquiring power include: as an authority, confer authority on someone else; partner with authority; don't be wrong; stay quiet to preserve the currency of your voice; partner with competence; introduce ideas; support a controversial idea; and challenge opponents.

The second of the three principles is control of tension. The productivity of individuals often corresponds with the tension they feel. The appropriate pressure—neither too much nor too little—will result in people working at peak efficiency. People work toward ideas more productively when they are closest to their optimal tension level. People are less productive the further they are from their optimal tension level. Techniques for increasing tension include: bring up a provocative idea; break up a faction; be more extreme in all positions; disagree with the group; challenge someone; and remain silent. Techniques for reducing tension include: bring up a calming idea; be less extreme in all positions; complete an easy idea; agree with an idea that most of the group favors; build a faction around a unifying idea; and support a person.

The third of the three principles is the ability to elicit a rich portfolio of ideas. The goal is to ensure that ideas are generated in quality and quantity in order to uncover the best options. Rarely does one person hold all the answers; everyone needs to be brought in. Techniques for increasing the flow of ideas include: decrease tension below the productive level; increase tension above the productive level; listen to the discordant voice; listen to the quiet voice; uncover underlying issues; and introduce ideas without power.

When all of the three principles are aligned and balanced, leaders will commit themselves to a course of action to have ideas approved. They now use their power to actively suppress any new ideas and continue to moderate tension, but less actively. They know the completion of the right idea ultimately benefits themselves and the entire organization. Two types of ideas, however, need special focus. A leader should make an effort to get quick-fix ideas that distract from the organization's vision passed as soon as possible. Passing quick-fix ideas may allow the group to more effectively evaluate the important ideas. In addition, a leader must avoid quick-fix ideas that lead to a false sense of accomplishment. Some quick-fix ideas will overly distract people, preventing them from effectively evaluating the more important ideas. Such quick-fix ideas may appear to reduce short-term symptoms but will actually increase the problem in the medium and long term. These quick-fix ideas, often incompatible with the critical work, represent a threat to success and need to be avoided.

A common mistake is to focus too much on any one of the three principles at the expense of the others. A bigger mistake is for individuals to treat any one of the principles as goals in and of themselves. As a result, none is used to forward the cause. Power hoarded instead of deployed is wasted.

Utilizing the above-described leadership program, the present invention has a user experience a series of virtual meetings, each session including an introduction, meeting, and a metrics portion. During each meeting the user or animated characters may introduce, oppose, or support ideas or characters. To do so, the user or animated characters may disagree on ideas or form alliances and opponents around ideas. The animated characters participate in the meetings and look to the user and each other animated character for help, direction and support. The user can bring these animated characters into the conversation if they are left out. The user can agree or disagree with the animated characters, calm them down, or rev them up. The system and method of the present invention is described in more detail herein below.

Definitions

The term artificial intelligence system refers to a system that is capable of imitating intelligent human behavior.

The term micro-strategy system refers to a set of rules within the artificial intelligence ("AI") system that are used to evaluate how each character may act or react in a particular situation. The micro-strategy ("MS") system is a part of the AI system.

The term physics system refers to a system that, for example, distributes and monitors points for a user character and animated characters based on their activity during a virtual meeting. The physics system also includes a dialog system and an animation system for generating and activating the characters to interact with each other.

The term XML data refers to XML fixed data and/or XML variable data. The context in which the term is used should indicate the specific type of data that is intended. The data may be structured in extensible markup language ("XML") or some other language allowing a programmer to structure the data. XML data may be stored in an XML database.

The term XML fixed data refers to non-modifiable data in the program software that may be used to establish fixed attributes of each character. Examples of XML fixed data include a character's expressiveness, tension impact of each idea, and formal authority. It is notable that XML fixed data is modifiable by a programmer when setting character attributes, however, non-modifiable by the program during its operation.

The term AML variable data refers to modifiable data in the program software that represents variable attributes of each character. Examples of XML variable data include a character's tension, personal influence, and a characters. It is notable that XML variable data is modifiable by a programmer when setting character attributes and modifiable by the program during its operation.

The term interface refers to the hardware and/or software utilized by a user to interact with animated characters in a virtual meeting.

The term in real time refers generally to the occurrence of a reaction at or about the time an action prompting the reaction takes place.

The term dynamically render in real time or the like refers to the generation of an animated character's actions based on more elemental (e.g., component) actions at or about the time the character's actions are required for viewing by a user. For example, the system may generate the actions of an animated character, which includes a statement made by the animated character, movement of the animated character's facial features to match the statement, and hand gestures to emphasize the animated character's statement, in response to another animated character's actions.

The term character is used generally to describe either a user character (combination of the user and his character played during a virtual meeting) or an animated character. The user character and animated characters are the same in some respects (e.g., both the user character and animated characters have XML data defining their personal influence and tension) but different in other respects (e.g., the system user may support or oppose another character at any time.)

The term vocal gesture refers to dialog generated by the physics system and spoken by a character. Vocal gestures may be a part of a character's active actions to which other characters respond.

The term physical gesture refers to physical movements made by the characters. Physical gestures may be a part of a character's active actions to which other characters respond or a part of a character's reactive actions in response to another character's active actions.

The term gesture refers to either a vocal or a physical gesture.

The term logic round refers to a cycle through the AI and physics systems wherein it is determined which animated characters are to be active, which animated characters are to be reactive, and how each character will act/react, respectively.

FIG. 1 is a block diagram of an exemplary computer system on which the present invention may be installed and used by a user. A motherboard (not shown) includes a data bus, which provides bi-directional communication between the system's components and a CPU. The components include a display interface, which drives a monitor, providing the video signals necessary to produce a graphic display. A hard drive interface provides bi-directional communication between a hard drive and the data bus, enabling data and machine instructions comprising executable programs to be stored and later read into a memory. The memory includes both a read only memory (ROM) and random access memory (RAM). The ROM is used for storing a basic input/output operating system used in booting up the computer system and other instructions essential for its operation. Machine instructions comprising executable programs are loaded into the RAM via the data bus to control the CPU.

A serial/mouse port provides an interface for a mouse to the data bus so that signals indicative of movement of the mouse and actuation of the buttons on the mouse are input to the CPU. A CD-ROM interface couples a CD-ROM drive to the data bus and may include a small computer system interface or other appropriate type of interface designated to respond to the signals output from the CD-ROM drive. A sound system card is connected to the data bus and its output is coupled to an amplifier and speaker system to provide a sound capability for the computer system. Output signals from a keyboard are connected to a keyboard interface, which conveys the signals from the keyboard to the data bus.

A communication adapter such as a modem may be used to couple the computer system to a telephone line. An integrated services digital network (ISDN) would be a desirable alternative to the modem, since the ISDN interface can transfer data at a rate of 64 Kbps or more. The computer may also be coupled to a telephone line using digital subscriber line (DSL) technology.

The hard drive includes programs and files for implementing the present invention. The programs and files include an operating system, artificial intelligence and micro-strategy system, physics system, animation system, dialog system, characters and ideas files, and ancillary program files. Operation of these programs and files is described in more detail herein below.

The specification for an exemplary computer system for running the programs and files of the present invention is a Pentium III® 450 Mhz CPU, 64 MB RAM, Windows® 95/98/ME/2000 OS, 8× CD-ROM, Windows® compatible sound card, 16 MB 3D accelerated graphics card, and approximately 200 MB of hard drive space.

Figure 2:
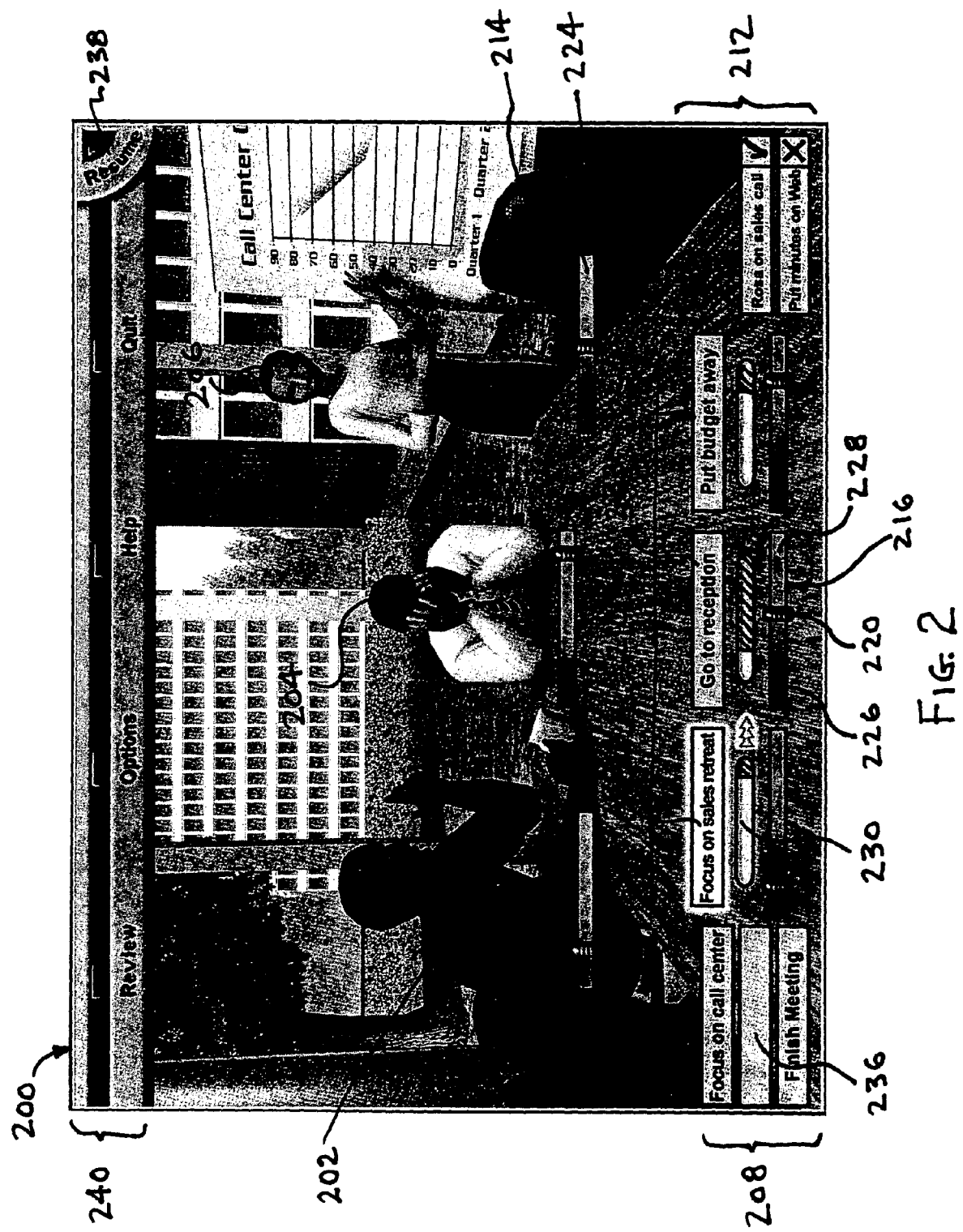
FIG. 2 is a exemplary screen-shot taken during a virtual meeting.

FIG. 2 is an exemplary screen-shot 200 viewed by a user during a virtual meeting. The virtual meeting takes place in a meeting room with three animated characters 202, 204, and 206, sitting at one end of a table generally facing toward the user. Controls are provided to enable the user to interact as a user character with the learning system. Ideas that are to be introduced during the virtual meeting are initially positioned on the lower left-hand portion of the screen 208. The ideas migrate to the lower center portion of the screen 210 when being considered by the characters. The ideas migrate to the lower right-hand portion of the screen 212 after they have been considered and are accepted (identified by a check mark) or preempted (identified by a cross-out mark.) Once ideas are positioned on the lower right-hand portion of the screen 212 they cannot be reintroduced for consideration.

Introducing, supporting/opposing, and completing ideas impacts the characters' scores, as described in more detail herein below.

The vocal and physical gestures of animated characters throughout a virtual meeting are dynamically rendered in real time. For example, distinct movement segments of each animated character are stitched together as the virtual meeting evolves in order to form a coherent and realistic meeting scene. For example, animated character 204 is shown putting his face into his hands, thereby gesturing to the user and other animated characters that he opposes a statement made by animated character 202 (as described in more detail herein below, the decision to have animated character 202 actively act and have animated character 204 reactively act is determined by the AI and physics systems.) Following animated character 204's physical gesture, a segment may be shown of animated character 204 standing up and shaking his head to show further opposition to the statement. Transitions between movement segments are blended to eliminate skipping or jumping of the scene. Movement segment stitching is carried out to provide spontaneous and realistic interactions between the user and the animated characters during a virtual meeting. Consequentially, each meeting scene is unique.

Hand generated animation is used in the present invention because of the fine movements that are required by each animated character to accurately portray their physical gestures. Such gestures include face gestures (such as frowns, smiles, and grins), hand gestures (such as finger tapping or pencil tapping) to indicated an animated character's support of, or opposition to a statement made by another character.

All animated characters and ideas have an opinion bar below them as exemplified by bars 214 and 216, respectively, depicting the user's opinion of each animated character and idea. The character and idea opinion bars include a slider lever 218 and 220, respectively, that indicate the degree of approval/disapproval the user has of the particular character or idea. If an opinion bar is not on the screen, the user may move the mouse cursor over the person or idea and it will appear.

To criticize an animated character the user may mouse click on the left-hand side of the animated character's opinion bar 222, and to praise the animated character the user may mouse click on the right-hand side of the animated character's opinion bar 224. Similarly, to oppose an idea the user may mouse click on the left side of the idea's opinion bar 226, and to support an idea the user may mouse click on the right-hand side of the idea's opinion bar 228. The magnitude of the user's positive or negative support/opposition will correspond to how far from the center of the opinion bar that the user clicks on the bar.

All ideas under consideration by the character and user 210 have progress bars 230. The progress bars may be combined with the idea windows under consideration (e.g., as a background). The degree of acceptance of an idea under consideration is indicated by the degree to which the respective progress bar is filled. When a progress bar is completely filled, the idea is completed and moves to the lower right-hand side of the screen 212.

An active idea is the current topic and the only idea a group can work on. Only one idea may be active at a time. The active idea, for example, active idea 232, includes a halo around it for identification. After being introduced, ideas may be paused as another idea is made active. For example, idea 233 and idea 234 are paused while active idea 232 is being considered. A character may reintroduce a paused idea. Some ideas, for example, idea 236, can only be seen by the user after one of the animated characters introduces the ideas. A user can implement different strategic techniques (e.g., raise the tension in the room) to induce an animated character to introduce a hidden idea.

A user may pause the virtual meeting utilizing a pause/resume button 238 in order to activate a selection bar 240 or resume a virtual meeting. The selection bar 240 includes the buttons options, help, and quit. Options activated by the options button include the selection of a screen resolution, volume control, activation of closed captioning to show opinions, tensions, and strategies of animated characters.

The animated characters can do anything a user can do except a user can also pause the game (as described above) or actively act (e.g., speak by selecting a point on an opinion bar) at any time. Animated characters actively act or react as directed by the AI and physics systems as described in more detail herein.

Figure 3:
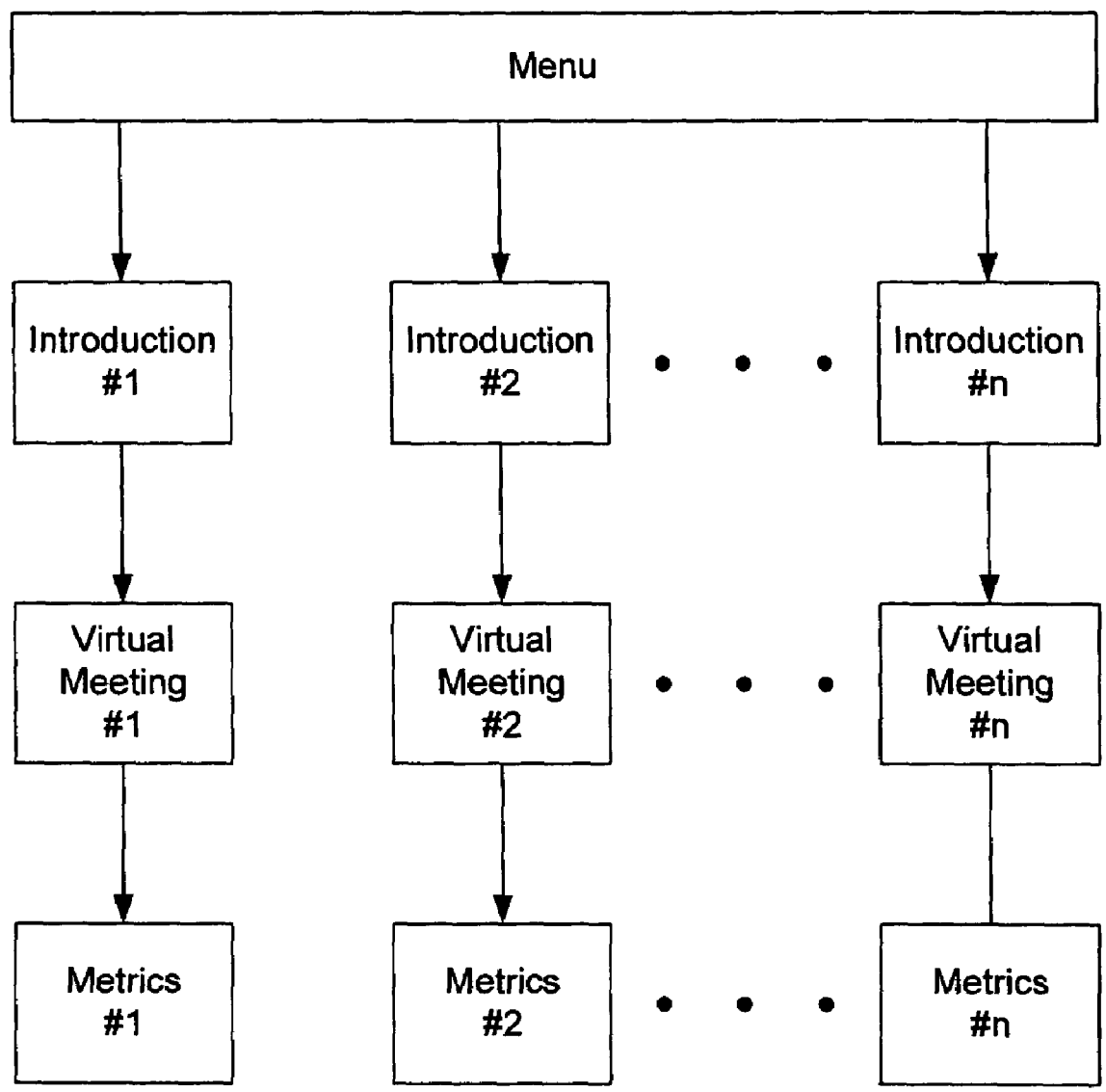
FIG. 3 is a flow chart illustrating the overall flow of an embodiment of the present invention.

FIG. 3 is a flow chart illustrating the overall flow of a learning system that utilizes an embodiment of the present invention. When a user initiates the learning system a menu is displayed. The menu includes a selection of virtual meetings (1 through n). Generally, the virtual meetings are progressively more challenging, that is, meeting 2 is more challenging than meeting 1, meeting 3 is more challenging than meeting 2, etc. During each virtual meeting, the user plays the role of a manager of a department in a corporation, thereby requiring him to take a leadership role during each virtual meeting.

A first meeting, for example, may be between the user as a call-center supervisor and his call-center staff. In such a scenario the user character may have relatively high formal authority (he is the boss), a relatively low starting tension level, and a high level of likelihood to talk (these and other character attributes are discussed in more detail herein below.) A second meeting may be between the user character as call-center supervisor, the user character's key call-center staff members, and the user character's immediate supervisor. In such a scenario the user character may have relatively high formal authority in relation to the key staff members; however, relatively low formal authority in relation to his immediate supervisor. In addition, the user character may have a relatively high starting tension level and medium level of likelihood to talk.

Prior to each virtual meeting (1 through n) an introduction (1 through n, respectively) is displayed to the user to establish the reason for, and importance of the upcoming meeting. After each virtual meeting a variety of metrics (1 through n, respectively) are displayed to the user to provide a qualitative and quantitative assessment of the user's performance during the virtual meeting. The metrics are discussed in more detail herein below.

Those of ordinary skill in the art of learning programs will readily appreciate that although the description of the preferred embodiment of the present invention concerns a user that is involved in virtual meetings in a corporate setting, other embodiments are envisioned by the inventors. For example, the present invention can be adopted to facilitate the training of a team of criminal investigators confronted with a crime that requires the cooperation of various departments within a law enforcement organization to solve the crime. Leadership and communication skills are undoubtedly indispensable tools that must be cultivated to operate successfully. The present invention is intended to facilitate the development and fine tuning of those indispensable skills.

In order to facilitate a better understanding of the disclosed invention, several graphs from the metrics portion of the flow chart illustrated are presently described with respect to FIGS. 4-10.

Figure 4:
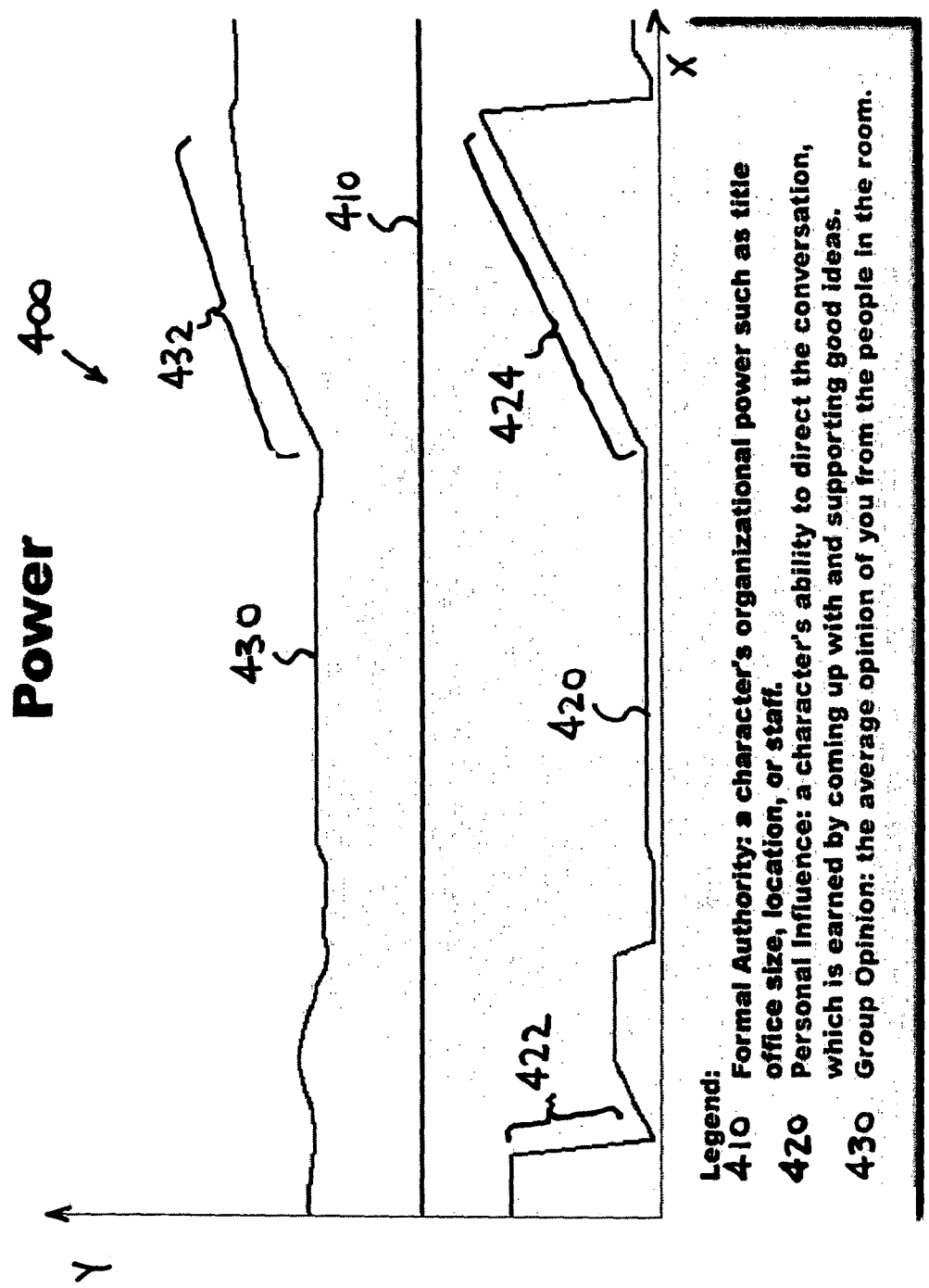
FIG. 4 is a screen shot of an exemplary graph showing the formal authority, personal influence, and group opinion power received by a player during a virtual meeting.

FIG. 4 is a screen shot of an exemplary graph 400 illustrating the gain and loss of the three types of power, i.e., formal authority, personal influence, and group opinion, that a user character has over the course of a virtual meeting. The "X" axis represents time and the "Y" axis represents relative power levels.

Curve 410 is a measure of formal authority power of a user character over the course of a virtual meeting. Formal authority power represents the organizational power a character has such as title, office size, office location, and staff. In the exemplary graph the formal authority power of the user character does not change over the course of the virtual meeting. This curve may change if, for example, the user character is promoted or demoted during a virtual meeting.

Curve 420 is a measure of personal influence power of a user character over the course of a virtual meeting. Personal influence power represents a character's leadership abilities. Personal influence power changes over the course of a virtual meeting; for example, it is reduced when a character introduces and supports an idea and increased when an idea is passed. In the exemplary graph the personal influence power of the user character is sharply decreased at 422 because the user character introduced an idea, and increased at 424 because the user character passed an idea. These observations become more clear in FIG. 8 (described herein below), wherein the exemplary graph of power is combined with an exemplary graph of ideas.

Curve 430 is a measure of group opinion power of a user character over the course of a virtual meeting. Group opinion power represents the average opinion that the animated characters have of the user character. Group opinion power changes over the course of a virtual meeting. In the exemplary graph the group opinion power of the user character is relatively stable over two-thirds of the virtual meeting, but can be seen to gradually increase during the last one-third of the virtual meeting at 432. This increase in power is likely due to the user character having passed an idea (compare the coincidental increase in group opinion power at 432 with the increase in personal influence power at 424.)

Figure 5:
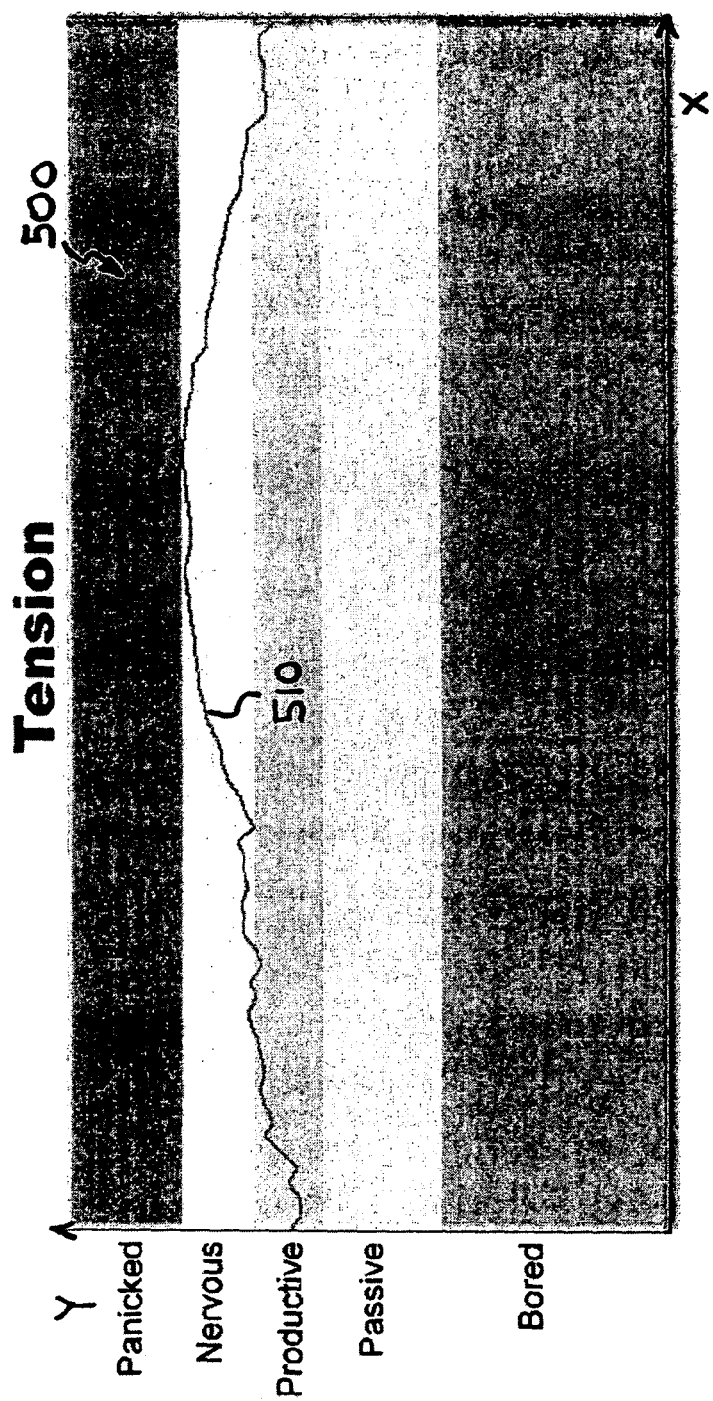
FIG. 5 is a screen shot of an exemplary graph showing the average collective tension of characters accrued during a virtual meeting.

FIG. 5 is a screen shot of an exemplary graph 500 illustrating the rise and fall of the average level of tension 510 of all of the characters in a virtual meeting. The "X" axis represents time and the "Y" axis represents relative tension levels ranging from bored (low tension level) to panicked (high tension level). Generally, when a controversial idea is raised during a virtual meeting the average tension level will rise, and when a calming idea is raised during a virtual meeting the average tension level in the room will fall. Ideally, the tension level should remain within the productive zone because it is in that zone where the characters, on average, are the most productive.

The impact of tension on a virtual meeting may be better understood when the tension of an individual character is considered. The initial tension of a character is established as an XML variable. Once a virtual meeting begins, the tension of a character rises and falls depending on the events that occur during the virtual meeting. For example, if an idea is raised that is controversial to a character (e.g., the company should declare bankruptcy") then the character's tension level will rise, and if an idea is raised that is calming to the character (e.g., "the company should have a sales retreat") then the character's tension level will fall. As noted, the character's productivity is affected by the character's level of tension. Therefore, actions taken by a character are progressively less productive as the character's tension level moves away from the productive zone an toward either the panicked zone or the bored zone. A character's actions may be progressively exaggerated when the character's tension level is above the productive zone and progressively blunted when the character's tension level is below the productive zone.

Figure 6:
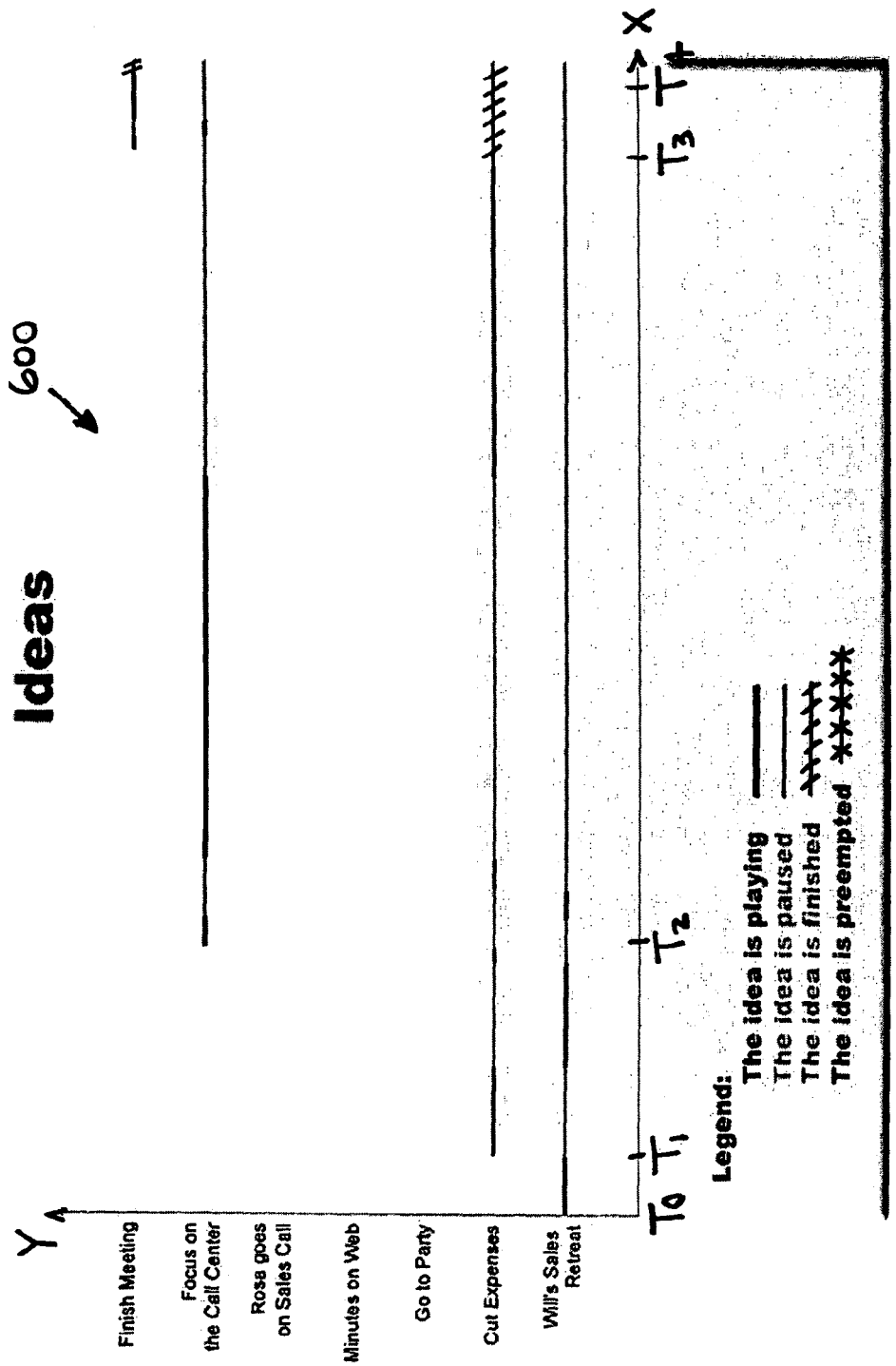
FIG. 6 is a screen shot of an exemplary graph showing the introduction of ideas and their status during a virtual meeting.

FIG. 6 is a screen shot of an exemplary graph 600 showing the introduction of ideas and their status during a virtual meeting. The "X" axis represents time and the "Y" axis includes a list of all possible ideas that may be introduced during a virtual meeting.

Ideas will have one of five states, that is, a new idea, active idea, paused idea, finished idea, or pre-empted idea. At the beginning of a virtual meeting, ideas are inactive, and only available to some of the characters. New ideas, which are represented in the new idea area on the lower-left corner of the screen (FIG. 2, item 208), are not in play. Any character with a new idea can play the idea by making it active. New ideas that a user character cannot introduce are depicted as hidden boxes in the new idea area (FIG. 2, item 236). An active idea is the current topic depicted with a halo at any given point (FIG. 2, item 232). Another idea must be introduced or reintroduced to change ideas. After being introduced, some ideas are put paused (FIG. 2, item 234) as another idea is made active. Any character may reintroduce a paused. When an idea is completed, it can no longer be discussed and is moved to the lower-right corner of the screen (FIG. 2, item 212). Incompatible ideas are pre-empted and are also moved to the lower-right corner of the screen. Two or more ideas can be incompatible, which means the completion of one pre-empts discussion on, introduction of, or completion of the other. They are also represented in the lower-right corner of the screen.

As illustrated in the exemplary graph (FIG. 6), four ideas were discussed at one time or another during the virtual meeting. At the inception of the meeting the idea "Will's Sales Retreat" was introduced for discussion (time "T0"). Thereafter, the idea "Cut Expenses" was introduced for discussion, at which time the idea "Will's Sales Retreat" was paused (time "T1"). After back-and-forth discussion between these two ideas the idea "Focus on the Call Center" was introduced for discussion (time "T2"). After more back-and-forth discussion between these three ideas the idea "Cut Expenses" was passed (finished) and the idea "Finish Meeting" was introduced for discussion (time "T3"). Shortly thereafter the idea "Finish Meeting" was passed and the meeting ended (time "T4").

An important aspect of a virtual meeting is for the characters to introduce, evaluate, build support for, and complete certain ideas. The user's performance at the end of each virtual meeting is most influenced by which ideas characters agree to pass and which they do not agree to pass. Some ideas are desirable, while others should be avoided. All ideas support meeting dynamics including tension, relationships, and other ideas. Different characters are predisposed to support and oppose different ideas, although their opinions might change significantly during the meeting. Each idea requires a certain amount of discussion before it is completed. Bigger ideas will require more work by the characters; smaller ideas will require less work by the characters. The percentage of work completed on each idea is indicated on each idea's progress bar.

As described in more detail herein below with respect to FIG. 17, each idea has an impact on the three performance metrics of financial impact, customer satisfaction, and employee satisfaction (moral). For example, if an idea to offer tuition reimbursement to all employees was passed, it may lower corporate profits, raise employee satisfaction, and have little impact on customer satisfaction.

Interaction between the characters is made dynamic through the use of the AI system and the physics system. As described in more detail herein below, the characters have predisposed positions regarding each idea and character when a virtual meeting begins, which may or may not change over the course of a virtual meeting based on the events that occur during the virtual meeting.

Introducing or reintroducing an idea costs personal influence power. A user character must have gained the trust of the group (gained group opinion power). If you do not have enough personal influence power, and you force your idea on them, they will increase their negative feelings toward you.

To introduce or reintroduce an idea means that you are imposing your will on the group. You are attempting to direct the conversation. If you are seen as a visionary or if you have significant personal influence with the group, they will follow you comfortably.

If the group does not respect your personal influence, they will feel annoyed by your intrusion and start to think less of your competence. If you continue to push your agenda on the group without sufficient personal influence, you will ultimately alienate and isolate yourself. Furthermore, the more extreme the idea, the greater personal influence you need to get to make progress on the idea.

A character's personal influence will increase when an idea that the character supported is finished or when any idea that the character supported is active.

Figure 7:
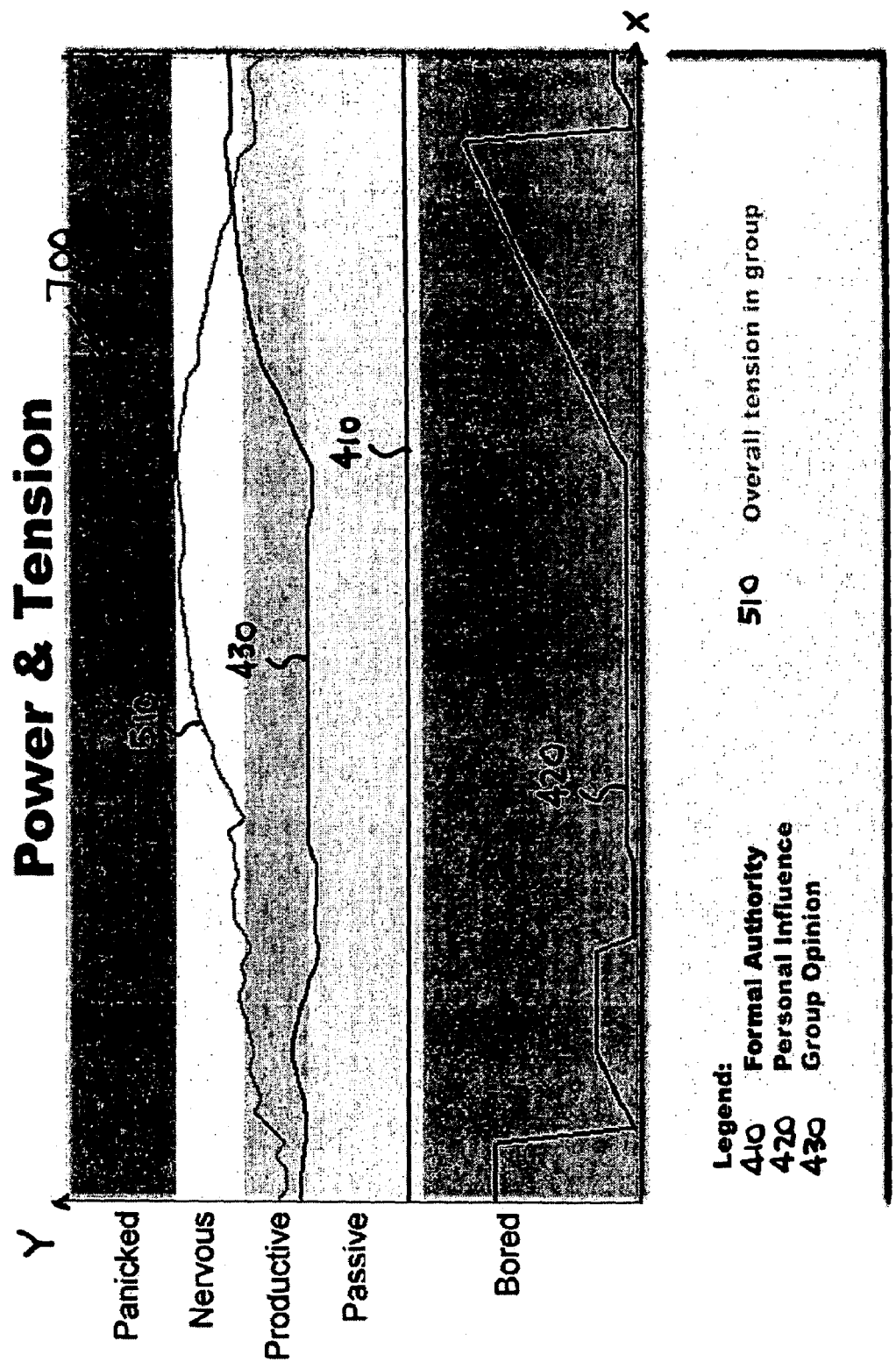
FIG. 7 is a screen shot of an exemplary graph that combines the graphs of FIGS. 4 and 5 for comparison.

FIG. 7 is a screen shot of an exemplary graph 700 that combines the graphs of FIGS. 4 and 5, that is, a user character's power and the average overall tension of the characters during a virtual meeting, respectively, for comparison. Such a graph provides a convenient way for a user character to compare the interplay between the user character's power, 410, 420, and 430, and the overall tension of the characters 510.

Figure 8:
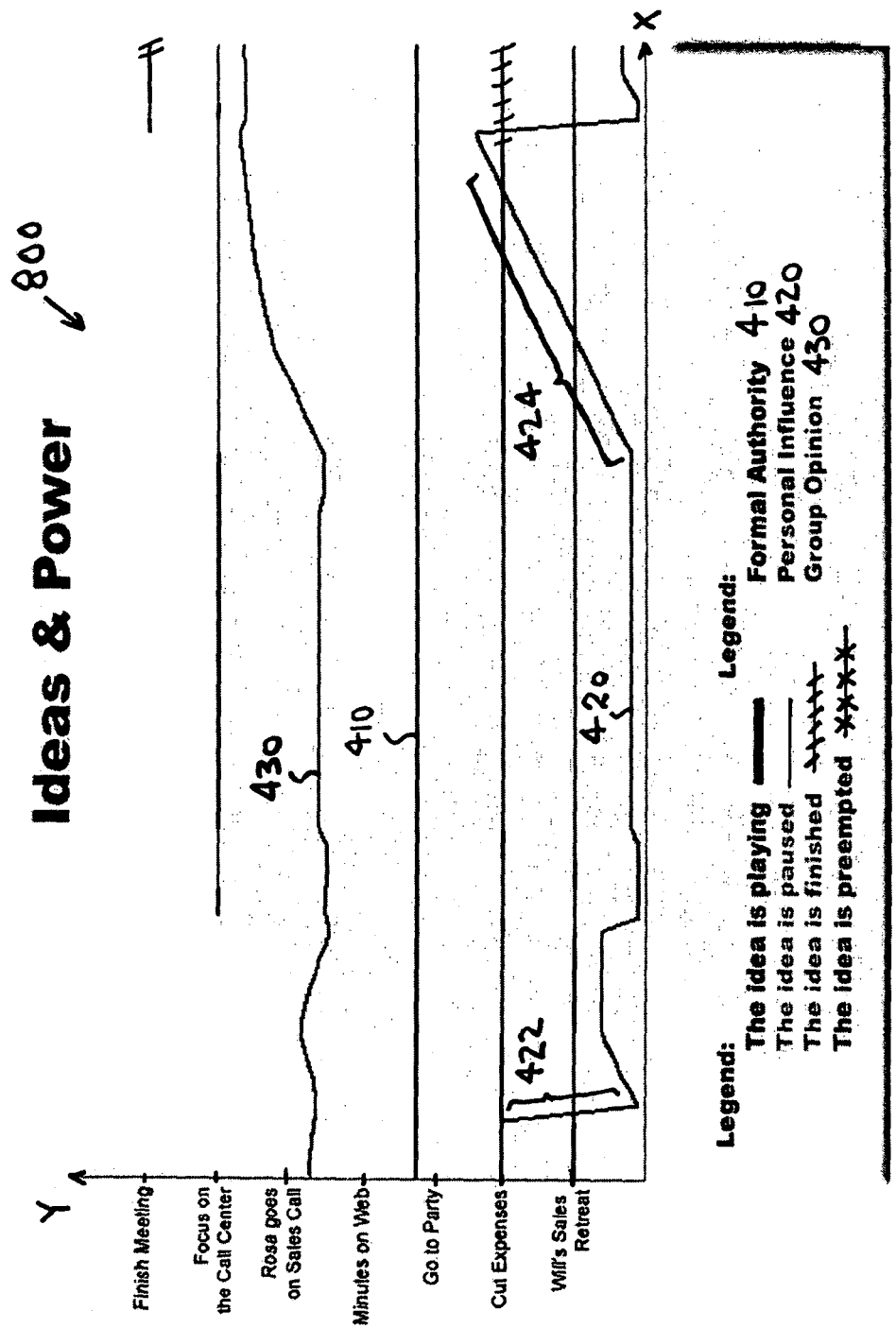
FIG. 8 is a screen shot of an exemplary graph that combines the graphs of FIGS. 4 and 6 for comparison.

FIG. 8 is a screen shot of an exemplary graph 800 that combines the graphs of FIGS. 4 and 6, that is, a user character's power and the ideas involved in a virtual meeting, respectively, for comparison. Such a graph provides a convenient way for a user character to compare the interplay between the user character's power, 410, 420, and 430, and ideas as they are introduced, discussed, rejected, and/or accepted during a virtual meeting.

Figure 9:
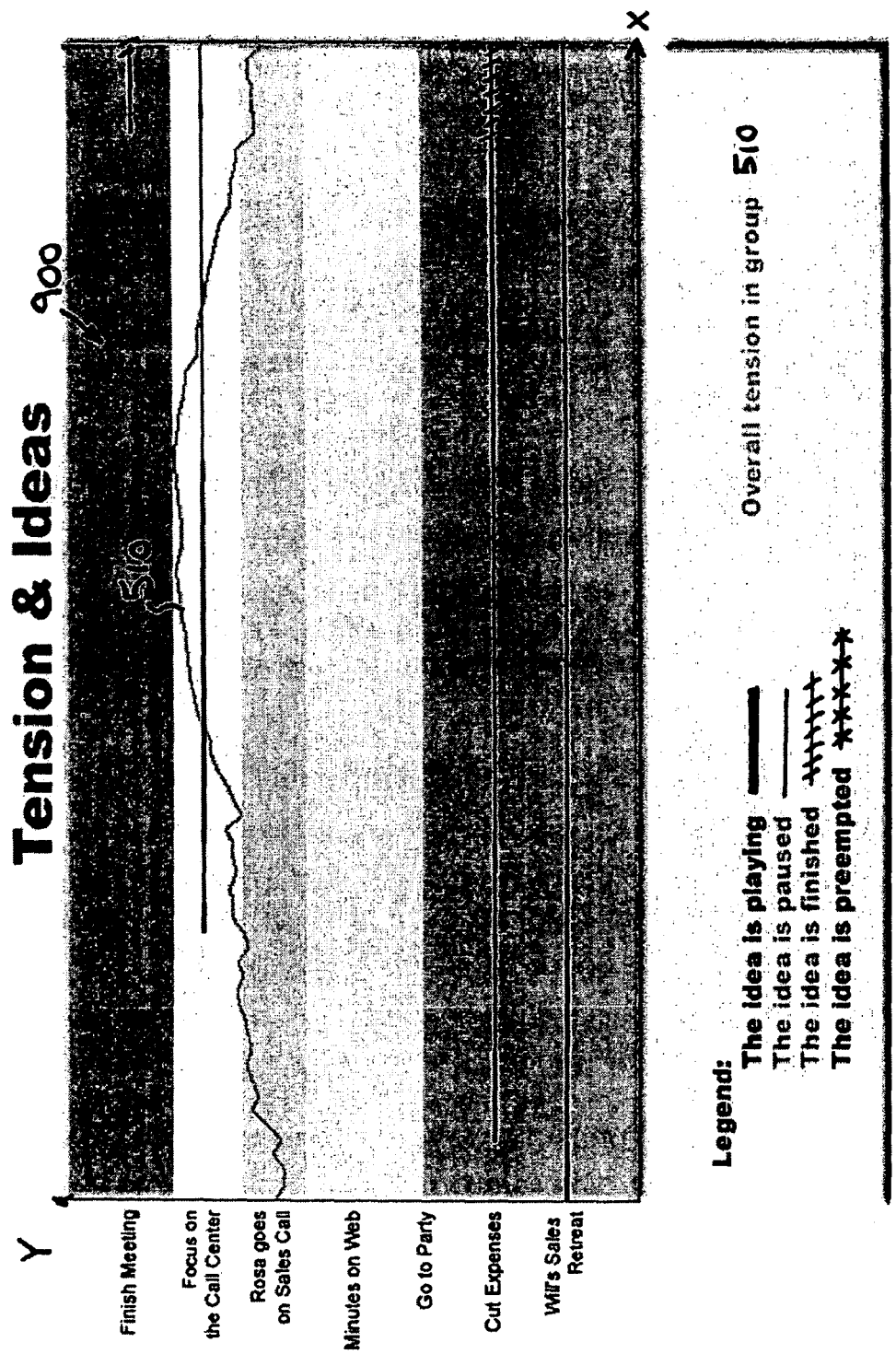
FIG. 9 is a screen shot of an exemplary graph that combines the graphs of FIGS. 5 and 6 for comparison.

FIG. 9 is a screen shot of an exemplary graph 900 that combines the graphs of FIGS. 5 and 6, that is, the overall tension of the characters during a virtual meeting and the ideas involved in a virtual meeting, respectively, for comparison. Such a graph provides a convenient way for a user character to compare the interplay between the overall tension of the characters 510 and ideas as they are introduced, discussed, rejected, and/or accepted during a virtual meeting.

Figure 10:
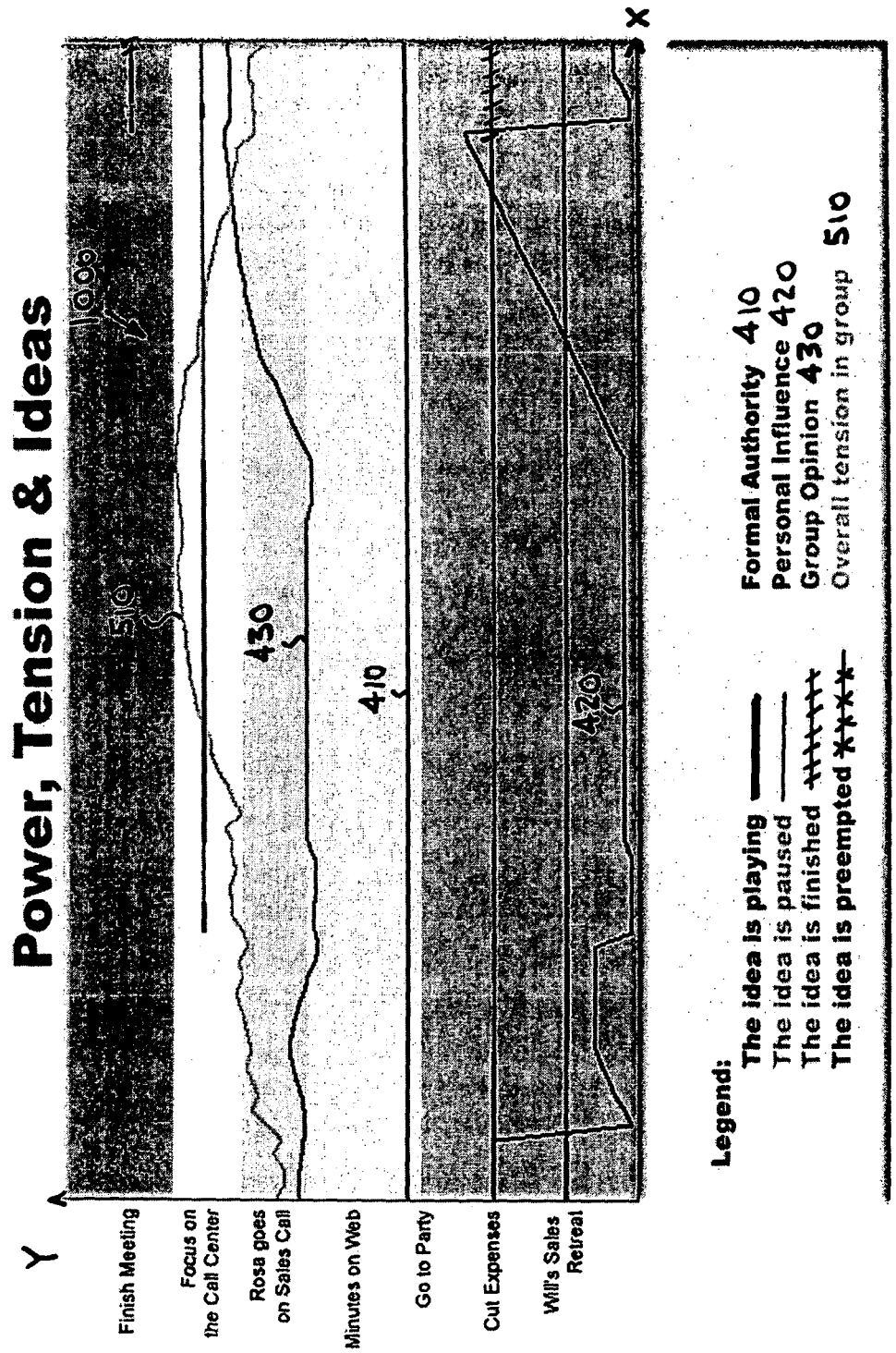
FIG. 10 is a screen shot of an exemplary graph that combines the graphs of FIGS. 4, 5, and 6 for comparison.

FIG. 10 is a screen shot of an exemplary graph 1000 that combines the graphs of FIGS. 4, 5, and 6, that is, a user character's power, the overall tension of the characters during a virtual meeting, and the ideas involved in a virtual meeting, respectively, for comparison. Such a graph provides a convenient way for a user character to compare the interplay between the user character's power, 410, 420, and 430, the overall tension of the characters 510, and ideas as they are introduced, discussed, rejected, and/or accepted during a virtual meeting.

Figure 11:
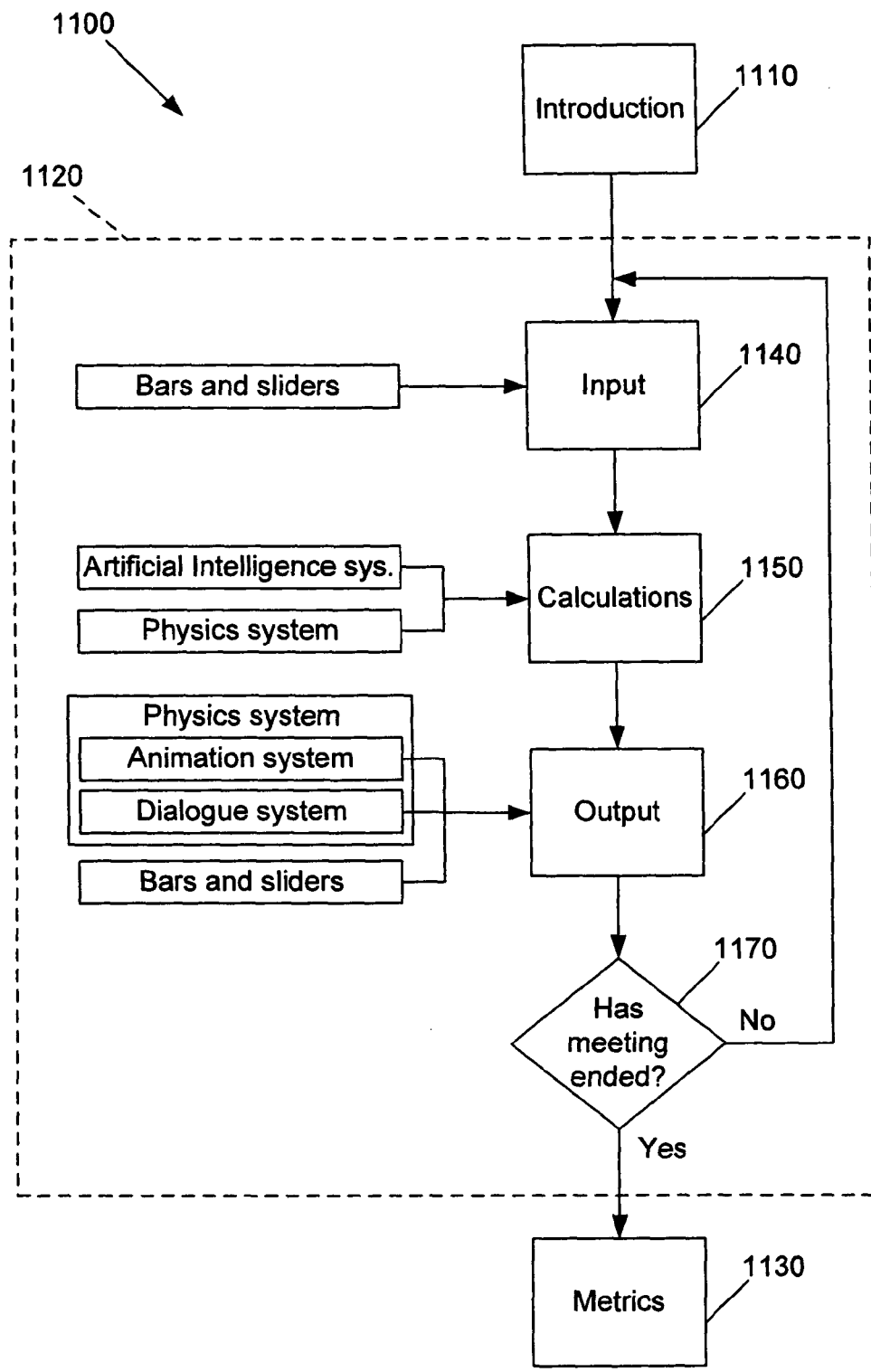
FIG. 11 is a flow chart illustrating an exemplary learning session.

FIG. 11 is a flow chart illustrating an exemplary learning session 1100 including introduction 1110, virtual meeting 1120, and metrics 1130 portions. During the learning session 1100 the introduction 1110 is displayed to the user to establish the reason for, and importance of the upcoming meeting. For example, the introduction may show the user opening a series of e-mails from call-center staff and management concerning problems confronting the corporation, and an e-mail from the user's immediate supervisor instructing the user to hold a meeting to come up with ideas directed toward fixing the problems. At the end of the introduction 1110, the user is placed in a virtual meeting room with other meeting participants, i.e., with animated characters.

The virtual meeting 1120 proceeds as discussed above with respect to FIG. 2 above. The logic of each meeting is generally in feedback loop format. The virtual meeting starts at step 1140 by receiving input from the user or an animated character. Input is received from the user or an animated character by their introducing, supporting, or opposing animated characters or ideas using the bars and sliders. If it is the first time through the loop, then the system may proceed directly to step 1150 and perform calculations based on XML data stored in the system.

At step 1150, the system performs certain calculations based on the user's or an animated characters' input using the AI and physics systems. For example, the calculations will determine which character will actively act, which ideas or characters the active character will support or oppose, the actions the active character will take, and the reactions the other characters will take. Because a user character may actively act at any time, an action by the user character will override aspects of a determination made by the system (e.g., as to which animated character will actively act) and, instead, all animated characters will reactively act to the user character's input.

At step 1160, the animation and dialog systems receive output from the calculations step 1150 where it is determined how each character will actively/reactively act. That is, the dialogue system will select and implement what the active character will say (i.e., generate a dialogue gesture) in support or opposition to an idea or character, as the case may be, and the animation system will select and implement how the active and reactive characters move (i.e., generate physical gestures). The bars and sliders in the display will adjust to reflect the output of the active and reactive characters. For example, if the active character opposes an idea, then the progress bar for the idea will move to the left away from acceptance. If, on the other hand, the active character supports an idea, then the progress bar for the idea will move to the right toward acceptance.

At step 1170, the system determines whether the idea for ending the meeting has been completed. If the idea for ending the meeting has not been completed, then the system returns to step 1140. If the idea for ending the meeting has been completed, then the system provides the user the metrics at step 1130.

Figure 12:
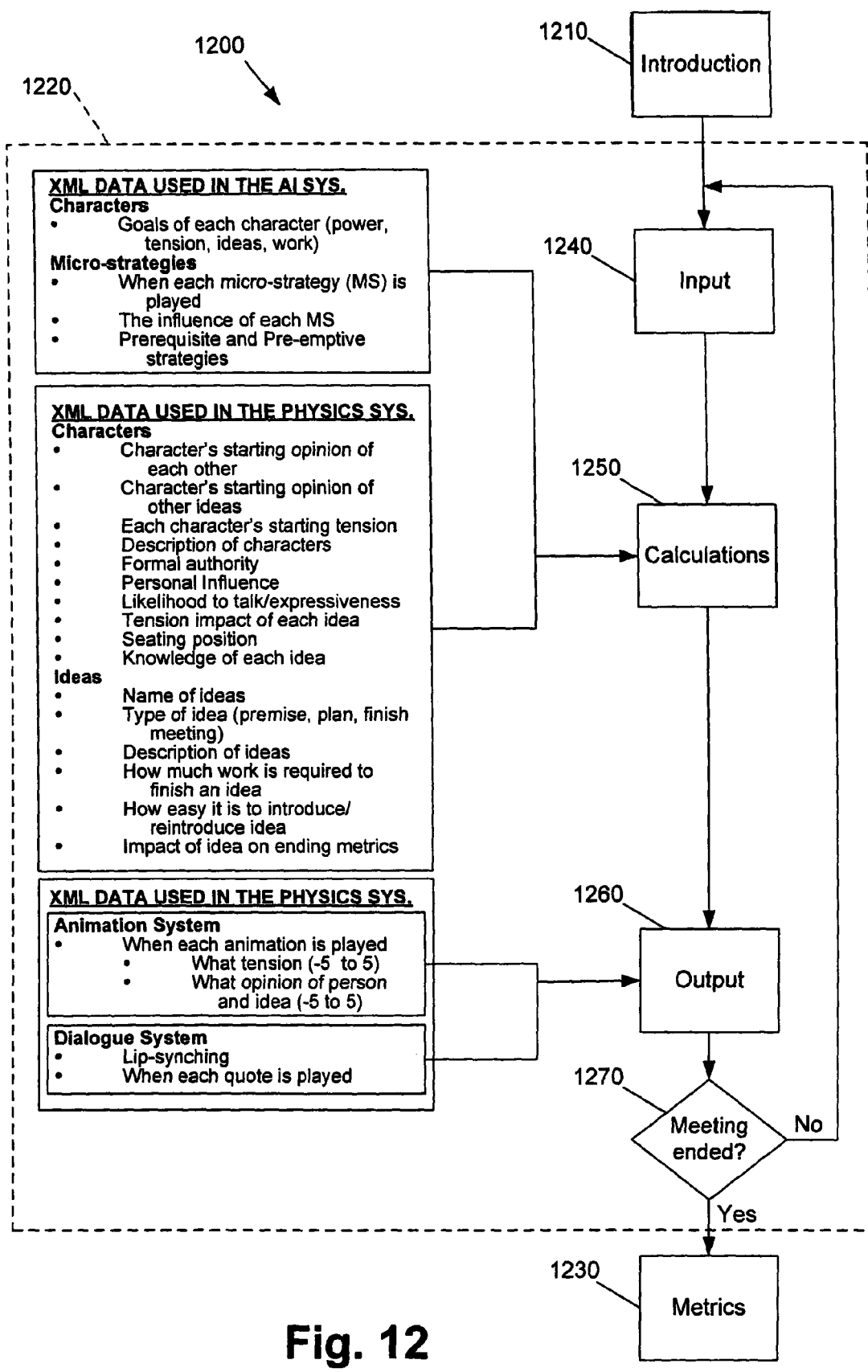
FIG. 12 is a flow chart similar to FIG. 11 illustrating the applicability of XML data to the steps in a virtual meeting.

FIG. 12 includes a flow chart 1200 illustrating an application of XML data to the steps in a learning session. The flow chart 1200 includes an introduction 1210, virtual meeting 1220, and metrics 1230 portions. The virtual meeting 1220 includes an input step 1240, calculations step 1250, and an output step 1260, and proceeds in a manner similar to that discussed above with respect to FIG. 11.

At the input step 1240 the virtual meeting starts by receiving input from a user or an animated character. Input is received from the user or an animated character by their introducing, supporting, or opposing animated characters or ideas using the bars and sliders.

At the calculations step 1250 XML data is used, for example, in calculations used to determine which character will actively act, which ideas or characters the active character will support or oppose, the actions the active character will take, and the reactions the other characters will take.

The XML data used in the AI system include data for characters including power goals of each character (fixed data), tension goals for each character (fixed data), idea goals for each character (fixed data), etc. The XML data used in the AI system also include data for micro-strategies including when each micro-strategy is played (fixed data), the influence of each micro-strategy (fixed data), and prerequisite and pre-emptive strategies (fixed data.)

The XML data used in the physics system include data for characters including each character's starting opinion of each other character (fixed data), each character's starting opinions of other ideas (fixed data), each character's starting tension (fixed data), description of characters (fixed data), etc. The XML data used in the physics system also include data for ideas including the name of ideas (fixed data), type of idea (fixed data), description of ideas (fixed data), how much work is required to finish an idea (fixed data), etc.

At the output step 1260, the animation and dialog systems receive output from the calculations step 1250 where it is determined how each character will actively/reactively act. That is, the dialogue system will select and implement what the active character will say (i.e., generate a dialogue gesture) in support or opposition to an idea or character, as the case may be, and the animation system will select and implement how the active and reactive characters move (i.e., generate physical gestures).

The XML data used by the animation system (which is part of the physics system) includes data for when each animation is played (fixed data), the tension level (variable data), and the opinion of persons and ideas (variable data.) The XML data used by the animation system (which is also part of the physics system) includes data for lip-synching (fixed data), and when each quote is played (fixed data).

Including XML data provides a significant advantage in that the software implementing the invention can be tailored to complement a particular corporate culture. For example, if a corporation desires for their personal to learn how to deal with an aggressive and overbearing workforce, the XML data for "character's starting opinion of each other," "character's starting opinion of other ideas," and "each character's starting tension" can be set at relatively high values so that the user character may experiment with different techniques to work with the corporate culture of the existing workforce as simulated by the animated characters.

XML data, both fixed and variable, of each character is viewed throughout the virtual meeting by each animated character. For example, during the calculations step animated character 202 (FIG. 2) can see all of the other characters' XML data describing their powers, likes, dislikes, etc. Note, however, a user character cannot see the animated characters' XML data.

At step 1270, the system determines whether the idea for ending the meeting has been completed. If the idea for ending the meeting has not been completed, then the system returns to step 1240. If the idea for ending the meeting has been completed, then the system provides the user the metrics at step 1230.

FIG. 13 is a table for illustrating the functionality of an exemplary micro-strategy ("MS") system, which forms a part of an artificial intelligence system. The table includes the following data. Column C1, lines L4-L6, include ideas 1-n that may be discussed during a meeting. Ideas include, for example, "put minutes on web," "put budget away," focus on sales retreat," and "finish meeting." Column C1, lines L7-L9, include animated characters 1-n that may be attendant at a meeting. The meeting discussed in FIG. 2 includes animated characters 202, 204, and 206. Next to each idea and animated character is a line (not separately numbered) labeled "S" indicating support for the idea or animated character and a line labeled "O" indicating opposition for the idea or animated character.

In columns C3-C6, line L1, are MS category headings that identify MSs pertaining to the three-to-one leadership methodology, i.e., power, ideas, tension, and work. Those skilled in the art will appreciate that embodiments including other leadership methodologies may be utilized to take advantage of the novel concepts of the present invention. In column C7, line L1, is a MS category heading that identifies reactive MSs, which will be described in more detail herein below.

In columns C3-C7, line L2, are MSs that relate to their respective MS category headings discussed above. Only one exemplary MS is shown under each MS category heading, however, any number of MSs may be included under each heading. In columns C3-C7, line L3, are point values that are associated with each MS. The point values for each MS can be included as XML data. In column C3, line L4-S, through column C7, line L9-O, the point values from columns C3-C7, line L3, have been applied in accordance with a method described herein below. In column C8, lines L4-L9, are the sums of the applied point values, which have been added across separately for each line from column C3-C7. For example, adding all of the point values associated with supporting Idea 1 in line L4-S results in a sum of 130 points in column C8, line L4-S. Similarly, adding all of the point values associated with opposing Idea 1 in line L4-O results in a sum of 50 points in column C8, line L4-O. A more explicit explanation of how the table illustrated in FIG. 13 is used in the present invention is discussed herein below with respect to FIG. 15.

During a logical round, the program runs through the MS system (exemplified by the table illustrate in FIG. 13) for each animated character. At the beginning of a meeting only the MSs under the MS category headings power (C3, L1), ideas (C4, L1), tension (C5, L1), and reactive (C7, L1) are considered to determine which animated character is going to actively act (of course, the user character can trump the process at any time). As noted above with respect to FIG. 12, the goals for power (power points), ideas (number of ideas under consideration), and tension (a productive tension range) are set as XML data. Each time a character reacts to an action taken by a character, the values for that character are adjusted accordingly, therefore, the XML variable data changes throughout the meeting. Whether the MSs under the MS category headings power, ideas, and tension (the MSs under the MS category heading reactive are always considered as they are involuntary) are considered during a round depends on whether the goals have been met.

As an example, with respect to personal influence power, a character's goal for such power points is set as XML fixed data at 15 power points. In this example it is assumed that a character initially has 10 power points (XML variable data) and he desires to introduce the idea "put away budget." It may cost the character 5 power points (XML fixed data) to introduce the idea, therefore the character is left with 5 power points (10−5=5). Later the character supports the same idea and in doing so the system subtracts 3 power points (XML fixed data), thereby leaving him 2 power points (5−3=2). When the idea is finally passed, the character receives 18 power points (XML fixed data) resulting in a total of 20 power points (18+2=20). Because the character's personal influence power points now exceeds the goal of 15 power points, the MSs under the MS category heading for power will not be considered in subsequent logic rounds for that character. If the character's personal influence power points are later reduced below 15 power points, the MSs under the MS category heading for power will be considered in subsequent logic rounds for that character.

As another example, with respect to ideas, a character's goal for idea points is set as XML data at 5 points. Initially, a character has zero idea points (XML variable data). One point is received by a character each time an idea is raised. Once the character's goal is met, the MSs under the MS category heading for idea will not be considered in subsequent logic rounds for that character.

Once the goal values for each "power," "ideas," and "tension" are met, the MSs under each of these MS category headings are no longer considered and the MSs under the MS category heading "work" are considered. It is notable that although the MSs under the MS category headings power, ideas, and tension are no longer considered, the values under power, ideas, and tension will continue to change during the meeting.

In operation, the MS system generally functions as follows (a more detailed example is provided herein below.) It is notable that as a part of the AI system, the MS system basically functions as another (non-animated) character. That is, it makes decisions as another user would make if attending the virtual meeting and utilizing an interface as illustrated in FIG. 2. Those skilled in the art will appreciate that the MS system utilizes fuzzy logic to perform decisions-making tasks that involve multiple variables and uncertainties associated with those variables.

At a particular point in the logic cycle (discussed in more detail herein below with respect to FIG. 15) the MS system is employed for each character to determine what action (e.g., a verbal and physical gesture in support or opposition to an idea or character) an animated character would take if permitted to actively act.

As noted above, initially the MS system looks at the power, ideas, and tension requirements of a character. Those values are maintained as XML variable data for each character. If any of these three requirements have not been met then the system evaluates the MSs under those categories in relation to the ideas and characters and ignores the MSs associated with the work. If the three requirements have been met then the system ignores the MSs associated with them and evaluates the MSs associated with work in relation to the ideas and characters. The system always evaluates the MSs associated with the reactive category.

In evaluating each MS, the MS system considers the appropriate XML data of each character. The MS system now considers each idea and each character in light of the each MS to see if the points associated with each MS should be applied. Once the entire MS table has been completed, the system totals the points in each row. For example, the total points for support of Idea 1 is 130 points (C8, L4-S); the total points for opposition of Idea 1 is 50 points (C8, L4-O); the total points for support of Chara. 1 is 85 points (C8, L7-S); the total points for opposition of Chara. 1 is 105 points (C8, L7-O). The MS system is run for each animated character and includes variables preset for each character. That is, the number of points assigned to each MS can be set differently for each animated character.

The physics system ultimately selects which animated character will actively act (discussed in more detail herein below) based on, for example, a comparison of each animated character's MS system output; when a character actively acted last (if a character recently actively acted he is less likely to actively act next), each animated character's expressiveness factor (XML data).

Figure 14:
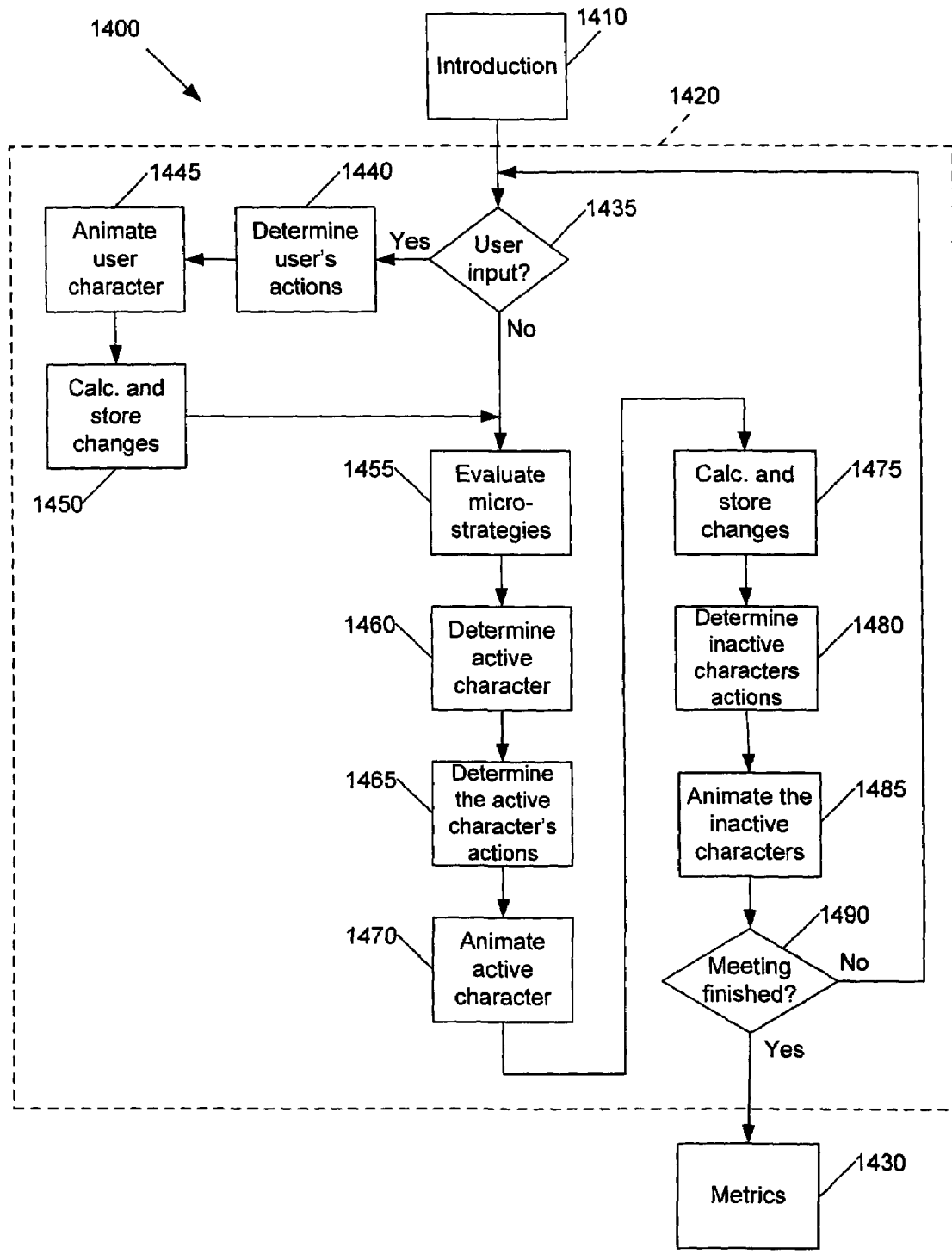
FIG. 14 is a flow chart illustrating an exemplary learning session.

FIG. 14 is a flow chart illustrating an exemplary learning session 1400 including an introduction 1410, virtual meeting 1420, and metrics 1430 portion. During the learning session 1400 the introduction 1410 may be displayed to the user to establish the reason for and importance of the upcoming meeting. At the end of the introduction 1410, the user is placed in a virtual meeting room with meeting participants (animated characters). Each virtual meeting will start with the introduction of an idea, e.g., organize a sales retreat.

At step 1435 the program determines if the user character has provided input, e.g., has the user character introduced an idea, supported or opposed an idea, supported or opposed an animated character. If the user character has provided input, then the program proceeds to step 1440. At step 1440 the program, via the physics system, determines the action that the user character will take. For example, if the user character indicated that he supports the idea "go to reception" 233 by clicking on the right-hand side 228 of slider bar 216 (FIG. 2), then the physics system may determine that the user character will state "I strongly recommend that we all plan on going to the reception." At step 1445 the user character can be heard to make the statement selected by the physics system. At step 1450 the program recalculates each character's XML data based on what the user character stated. For example, if the statement made by the user character completes the idea, at which point the idea box 233 moves to the lower right corner of the screen, then the user character and all other characters that supported the idea will receive more personal influence (power) points. Thereafter, the program proceeds to step 1455.

If, at step 1435, the program determines that the user character has not provided input, e.g., the user character did not introduce an idea, support or oppose an idea, support or oppose an animated character, then the system goes directly to step 1455. At step 1455 the AI's micro-strategy system (MS system) is implemented. Operation of the system is described with respect to FIGS. 13 and 15.

Figure 15:
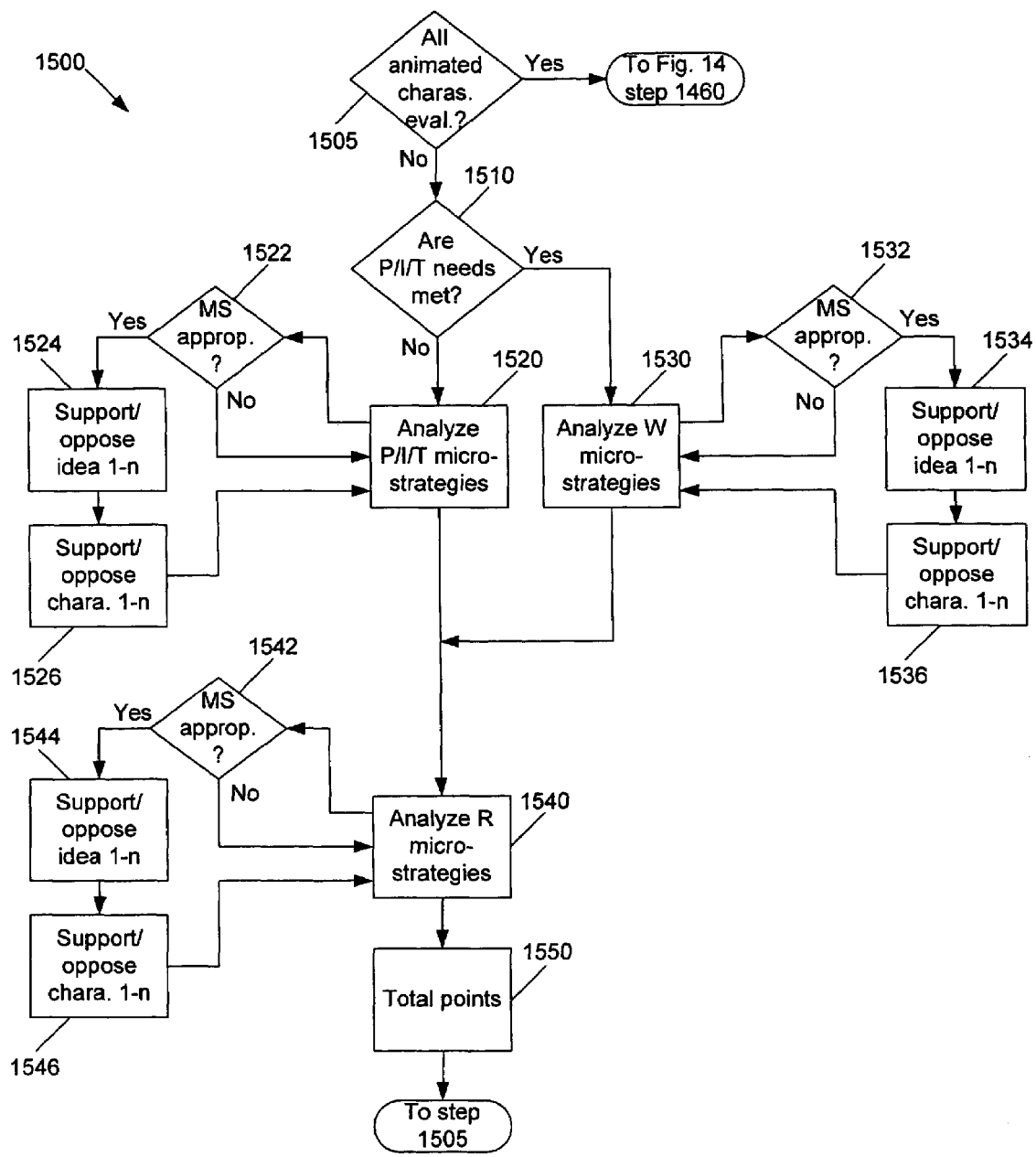
FIG. 15 is a flow chart illustrating operation of the exemplary micro-strategy system illustrated in FIG. 13.

FIG. 15 is a flow chart 1500 illustrating operation of the exemplary MS system illustrated in FIG. 13. Steps 1510-1550 are carried out for each animated character every time step 1455 (FIG. 14) is performed. Therefore, in the virtual meeting illustrated in FIG. 2, for example, steps 1510-1550 would be carried out three times, once for animated character 202, once for animated character 204, and once for animated character 206 each time step 1455 (FIG. 14) is performed. Generally, the MS system evaluates what action an animated character would take if given the opportunity to actively act.

At step 1505, the program determines whether or not all of the animated characters have been evaluated in the MS system. If all of the animated characters have been evaluated, then the system proceeds to step 1460 (FIG. 14). If any animated character has not yet been evaluated, then the system proceeds to step 1510.

At step 1510, the MS system determines whether the power (C3, L1), ideas (C4, L1), and/or tension (C5, L1), ("P/I/T") requirements of the animated character have been met. For example, if the XML data for an animated character establish the power, ideas, and tension goals for an animated character to be 50 power points, 4 ideas, and tension in the range of 0.5 to 2 points and the animated character has acquired these goals, then the MS system will proceed to step 1530 to analyze the micro-strategies under the MS category work (C6, L1). If any of the power, ideas, or tension goals have not yet been met, then the MS system will proceed to step 1520 to select the micro-strategies under these MS categories. Upon selecting a micro-strategy, the MS system proceeds to step 1522.

In evaluating the micro-strategies, the MS system considers each animated character's XML data. Therefore, each animated character can "see," for example, which ideas and characters the other characters like or dislike, the other character's power levels, the other character's goals.

At step 1522, assuming none of the goals have been met (and therefore all of the micro-strategies under the MS categories power, ideas, and tension are to be considered), the MS system determines whether micro-strategy C3-1 under the MS category power (C3, L1) is appropriate to meet the animated character's needs. For example, under the MS category power (C3, L1), the micro-strategy C3-1 states that "without formal authority, partner with someone who is supporting a favored idea." Micro-strategy C3-1 may not be appropriate if the animated character has sufficient power to pass his favored ideas. If micro-strategy C3-1 is not appropriate, the MS system will return to step 1520 to select the next micro-strategy under the MS category power (C3, L1) and to step 1522 to determine if it is appropriate, and so on (evaluating micro-strategies C3-2 thru n). If, at step 1522, the MS system determines that the micro-strategy under consideration is appropriate, then the MS system proceeds to step 1524.

At step 1524, assuming micro-strategy C3-1 is appropriate, the MS system proceeds to consider Idea 1 to determine if, in light of micro-strategy C3-1, supporting Idea 1 will likely result in the animated character receiving additional power points. If the answer is "yes," then the designated points are assigned to cell C3, L4-S under micro-strategy C3-1. If the answer is "no," then no points are assigned to cell C3, L4-S under micro-strategy C3-1. The MS system then proceeds to consider Idea 1 to determine if, in light of micro-strategy C3-1, opposing Idea 1 will likely result in the animated character receiving additional power points. If the answer is "yes," then the designated points are assigned to cell C3, L4-O under micro-strategy C3-1. If the answer is "no," then no points are assigned to cell C3, L4-O under micro-strategy C3-1. The MS system then proceeds to Ideas 2-n and carries out a similar analysis.

At step 1526, the MS system proceeds to consider Character 1 to determine if, in light of micro-strategy C3-1, supporting Character 1 will likely result in the animated character receiving additional power points. If the answer is "yes," then the designated points are assigned to cell C3, L7-S under micro-strategy C3-1. If the answer is "no," then no points are assigned to cell C3, L7-S under micro-strategy C3-1. The MS system then proceeds to consider Character 1 to determine if, in light of micro-strategy C3-1, opposing Character 1 will likely result in the animated character receiving additional power points. If the answer is "yes," then the designated points are assigned to cell C3, L7-O under micro-strategy C3-1. If the answer is "no," then no points are assigned to cell C3, L7-O under micro-strategy C3-1. The MS system then proceeds to Characters 2-n and carries out a similar analysis.

An example of how a micro-strategy may be utilized in the MS system to determine whether to support an idea (i.e., apply designated points) so to possibly obtain power points for an animated character follows. Micro-strategy C3-1 states that "without formal authority, partner with someone who is supporting a favored idea." As noted above, in determining whether this micro-strategy is appropriate the MS system considers whether the animated character has sufficient power to pass his favored ideas. If so, then the MS system looks toward each character's XML data to determine which of the other characters have a predetermined amount of power and also support Idea 1. Including such criteria assumes that in supporting such characters it is more likely than not that one of them will pass Idea 1 and in doing so the animated character will share in the power points distributed for Idea 1 having been passed. If the MS system determines that other characters have the predetermined amount of power and also support Idea 1, then the predetermined amount of points, in this example 10 points, are applied to cell C3, L4-S under micro-strategy C3-1.

After completing steps 1524 and 1526, that is, after the analysis of Ideas 1-n and Characters 1-n in light of micro-strategy C3-1, the MS system returns to step 1520 and selects micro-strategy C3-2 (not shown), proceeds to step 1522 to determine if micro-strategy C3-2 is appropriate, and, if appropriate, proceeds to steps 1524 and 1526 to analyze Ideas 1-n and Characters 1-n as described above. If, at step 1522, micro-strategy C3-2 is not appropriate, then the MS system returns to step 1520 and selects the next micro-strategy, etc., until all of the P/I/T micro-strategies that are to be analyzed are in fact analyzed. After all of the P/I/T micro-strategies have been analyzed, the MS system proceeds to step 1540.

It is notable that the logic of each micro-strategy is programmed into the MS system. Those having ordinary skill in the art will appreciate that the exemplary MS-system utilizes fuzzy logic in the process for determining whether an animated character will support or oppose an idea or character. By utilizing such a system, animated characters can be configured to make decisions on complicated subject matter in a life-like manner. In addition, such a system is sufficiently flexible so changes may be made (e.g., altered/different micro-strategies, different point values, different ideas and characters) to reflect a change in the virtual meetings. Such changes are in part what differentiate the various virtual meetings. Furthermore, such a system is sufficiently flexible so that more significant changes can be made to create entirely different meeting scenarios (e.g., meetings between heads of state to discuss political/economic matters.)

At step 1540 the micro-strategies under the MS category reactive (C7, L1) are considered. Upon selecting a micro-strategy, the MS system proceeds to step 1542. The micro-strategies under MS category reactive (C7, L1) are considered every round for each animated character.

At step 1542, the MS system determines whether micro-strategy C7-1 is appropriate to meet the animated character's needs. For example, under the MS category reactive (C7, L1), the micro-strategy C7-1 states that it is "too tense, withdraw." Micro-strategy C7-1 will not be appropriate if the animated character is less tense than a predefined level, which may be described as XML data. If micro-strategy C7-1 is not appropriate, the MS system will return to step 1540 to select the next micro-strategy under the MS category reactive (C7, L) and to step 1542 to determine if it is appropriate, and so on (evaluating micro-strategies C7-2 thru n). If, at step 1542, the MS system determines that the micro-strategy under consideration is appropriate, then the MS system proceeds to step 1544.

At step 1544, assuming micro-strategy C7-1 is appropriate, the MS system proceeds to consider Idea 1 to determine if, in light of micro-strategy C7-1, supporting Idea 1 will likely achieve the result described in the micro-strategy. If the answer is "yes," then the designated points are assigned to cell C7, L4-S under micro-strategy C7-1. If the answer is "no," then no points are assigned to cell C7, L4-S under micro-strategy C7-1. The MS system then proceeds to consider Idea 1 to determine if, in light of micro-strategy C7-1, opposing Idea 1 will likely achieve the result described in the micro-strategy. If the answer is "yes," then the designated points are assigned to cell C7, L4-O under micro-strategy C7-1. If the answer is "no," then no points are assigned to cell C7, L4-O under micro-strategy C7-1. The MS system then proceeds to Ideas 2-n and carries out a similar analysis.

At step 1546, the MS system proceeds to consider Character 1 to determine if, in light of micro-strategy C7-1, supporting Character 1 will likely achieve the result described in the micro-strategy. If the answer is "yes," then the designated points are assigned to cell C7, L7-S under micro-strategy C7-1. If the answer is "no," then no points are assigned to cell C7, L7-S under micro-strategy C7-1. The MS system then proceeds to consider Character 1 to determine if, in light of micro-strategy C7-1, opposing Character 1 will likely achieve the result described in the micro-strategy. If the answer is "yes," then the designated points are assigned to cell C7, L7-O under micro-strategy C7-1. If the answer is "no," then no points are assigned to cell C7, L7-O under micro-strategy C7-1. The MS system then proceeds to Characters 2-n and carries out a similar analysis.

After completing steps 1544 and 1546, that is, after the analysis of Ideas 1-n and Characters 1-n in light of micro-strategy C7-1, the MS system returns to step 1540 and selects micro-strategy C7-2 (not shown), proceeds to step 1542 to determine if micro-strategy C7-2 is appropriate, and, if appropriate, proceeds to steps 1544 and 1546 to analyze Ideas 1-n and Characters 1-n as described above. If, at step 1542, micro-strategy C7-2 is not appropriate, then the MS system returns to step 1540 and selects the next micro-strategy, etc., until all of the reactive micro-strategies that are to be analyzed are in fact analyzed. After all of the reactive micro-strategies have been analyzed, the MS system proceeds to step 1550.

If, at step 1510, it is determined that all of the power, ideas, or tension goals have been met, then the MS system will proceed to step 1530 to select the micro-strategies under the MS category work (C6, L1). Upon selecting a micro-strategy, the MS system proceeds to step 1532.

At step 1532, the MS system determines whether micro-strategy C6-1 is appropriate to meet the animated character's needs. For example, the micro-strategy C6-1 states that there are "too few ideas finished, finish an idea which is almost finished." Micro-strategy C6-1 will not be appropriate if the number of ideas finished (that is, the ideas that are approved as shown at 212 in FIG. 2) is equal to or greater than the number established, as XML data, as being "too few" for that animated character. If micro-strategy C6-1 is not appropriate, the MS system will return to step 1530 to select the next micro-strategy under the MS category work (C6, L1) and proceed to step 1532 to determine if it is appropriate, and so on (evaluating micro-strategies C6-2 thru n). If, at step 1532, the MS system determines that the micro-strategy under consideration is appropriate, then the MS system proceeds to step 1534.

At step 1534, assuming micro-strategy C6-1 is appropriate, the MS system proceeds to consider Idea 1 to determine if, in light of micro-strategy C6-1, supporting Idea 1 will likely result in moving the idea toward completion (that is, move the idea toward acceptance or off of the table as shown at 212 in FIG. 2.) If the answer is "yes," then the designated points are assigned to cell C6, L4-S under micro-strategy C6-1. If the answer is "no," then no points are assigned to cell C6, L4-S under micro-strategy C6-1. The MS system then proceeds to consider Idea 1 to determine if, in light of micro-strategy C6-1, opposing Idea 1 will likely result in moving the idea toward completion. If the answer is "yes," then the designated points are assigned to cell C6, L4-O under micro-strategy C6-1. If the answer is "no," then no points are assigned to cell C6, L4-O under micro-strategy C6-1. The MS system then proceeds to Ideas 2-n and carries out a similar analysis.

At step 1536, the MS system proceeds to consider Character 1 to determine if, in light of micro-strategy C6-1, supporting Character 1 will likely result in moving the idea toward completion. If the answer is "yes," then the designated points are assigned to cell C6, L7-S under micro-strategy C6-1. If the answer is "no," then no points are assigned to cell C6, L7-S under micro-strategy C6-1. The MS system then proceeds to consider Character 1 to determine if, in light of micro-strategy C6-1, opposing Character 1 will likely result in moving the idea toward completion. If the answer is "yes," then the designated points are assigned to cell C6, L7-O under micro-strategy C6-1. If the answer is "no," then no points are assigned to cell C6, L7-O under micro-strategy C6-1. The MS system then proceeds to Characters 2-n and carries out a similar analysis.

An example of how a micro-strategy may be utilized in the MS system to determine whether to support an idea (i.e., apply designated points) so to possibly move the idea toward completion follows. Micro-strategy C6-1 states "too few ideas finished, finish an idea which is almost finished." As noted above, the MS system considers XML data of the animated character under consideration to determine if the number of ideas finished is less than the number established as being "too few" for that animated character. If the number is less then the established number, then the MS system will apply the designated points to support those ideas that are greater than, for example, 50% completed and the MS system may also apply the designated points to oppose those ideas that are less than, for example, 50% completed.

After completing steps 1534 and 1536, that is, after the analysis of Ideas 1-n and Characters 1-n in light of micro-strategy C6-1, the MS system returns to step 1530 and selects micro-strategy C6-2 (not shown), proceeds to step 1532 to determine if micro-strategy C6-2 is appropriate, and, if appropriate, proceeds to steps 1534 and 1536 to analyze Ideas 1-n and Characters 1-n as described above. If, at step 1532, micro-strategy C6-2 is not appropriate, then the MS system returns to step 1530 and selects the next micro-strategy, etc., until all of the work micro-strategies that are to be analyzed are in fact analyzed. After all of the work micro-strategies have been analyzed, the MS system proceeds to step 1540.

At step 1550, the MS system totals the assigned point values across for each idea and character, supporting and opposing, resulting in total points in column C8. These point values are used by the physics system as part of its determination of which animated character is going to actively act (vocally and physically gesture.) The line having the largest number identifies the idea or character that the animated character desires to support or oppose, as the case may be (the "desired topic".) Thereafter, the system returns to step 1505 to determine if all of the animated characters have been evaluated in the MS system. If all of the animated characters have been analyzed, then the program returns to step 1460 (FIG. 14) where the MS system output is passed to the physics system so it may determine which animated character is to actively act.

At step 1460, the physics system determines which character is to actively act. In doing so the physics system will compare the output of the MS system (the animated character having the highest point total is more likely to actively act); consider how large each animated character's highest point total is (the larger an animated character's point total, the more likely the character will actively act); consider which animated character most recently actively acted (the animated character that most recently actively acted is less likely to actively act next); consider each animated character's expressiveness number (the larger an animated character's expressiveness number (XML fixed data), the more likely that character will actively act), etc.

At step 1465, once an animated character has been selected to actively act, the physics system determines the animated character's vocal and complementary physical gestures. In doing so, the physics system seeks such gestures that are appropriate in light of the animated character's desired topic as determined in the MS system. For example, the results obtained in FIG. 13 indicate that the particular animated character desires to support Idea 1 because the highest total points in column C8 is 130 points which corresponds to supporting Idea 1. If Idea 1 is the idea "focus on sales retreat," then the physics system may select to have the animated character say "I think such a sales retreat will boost moral, and thereby increase our workforces sales." In addition, the physics system may select to have the animated character gesture with his hands to emphasize his statement.

At step 1470, after the verbal and physical gesture of the selected animated character has been determined, the physics system animates the animated character by having the character state the verbal gesture and make the physical gesture. Other phycsical gestures, such as the movement of the character's lips in synch with the verbal gesture, are also generated to provide a life-like animated character. In addition, if, for example, the idea was not yet on the table for discussion, then the physics system will cause the idea to move into the lower middle area in the display (move into area 210 of FIG. 2). Or, as another example, if the idea was already in area 210, then the physics system will cause the progress bar to move to the left or right, as the case may be. If the bar moves all the way to the right, the idea will be completed and moved to lower right portion of the display (area 212 of FIG. 2.)

At step 1475, the physics system recalculates each character's XML variable data based on the active animated character's vocal and physical gestures. For example, if support for Idea 1 by an animated character completes an idea, thereby causing it to be moved off the table to area 212 of FIG. 2, then personal influence power points will be distributed to that animated character and all other characters that supported the idea. Further, personal influence points will be taken away from those characters that opposed the idea. Furthermore, the idea may cause the tension of animated characters to go up or down (add or subtract tension points (i.e., XML variable data)), depending on what was said and the character's disposition toward that idea.

At step 1480, the physics system determines the inactive animated characters' actions. In doing so, the physics system considers the position each inactive animated character has with respect to the active animated character's vocal and physical gesture. For example, if an inactive animated character opposes an idea that the active animated character supported, then the inactive animated character may be instructed to scowl or shake his head in disagreement. At step 1485, the inactive animated characters' are animated as determined in step 1480.

If, at step 1490, it is determined that the idea "meeting finished" has not been completed (accepted and moved to area 212 of FIG. 2), then the program returns to step 1435. If, at step 1490, it is determined that the idea "meeting finished" has been completed, then the program terminates display of the virtual meeting and displays metrics at step 1430.

At step 1430, the program generates output reflecting how the user performed during the virtual meeting. As noted above, such output may include the graphs described above with respect to FIGS. 4-10 and graph and charts described herein below with respect to FIGS. 16-18.

Figure 16:
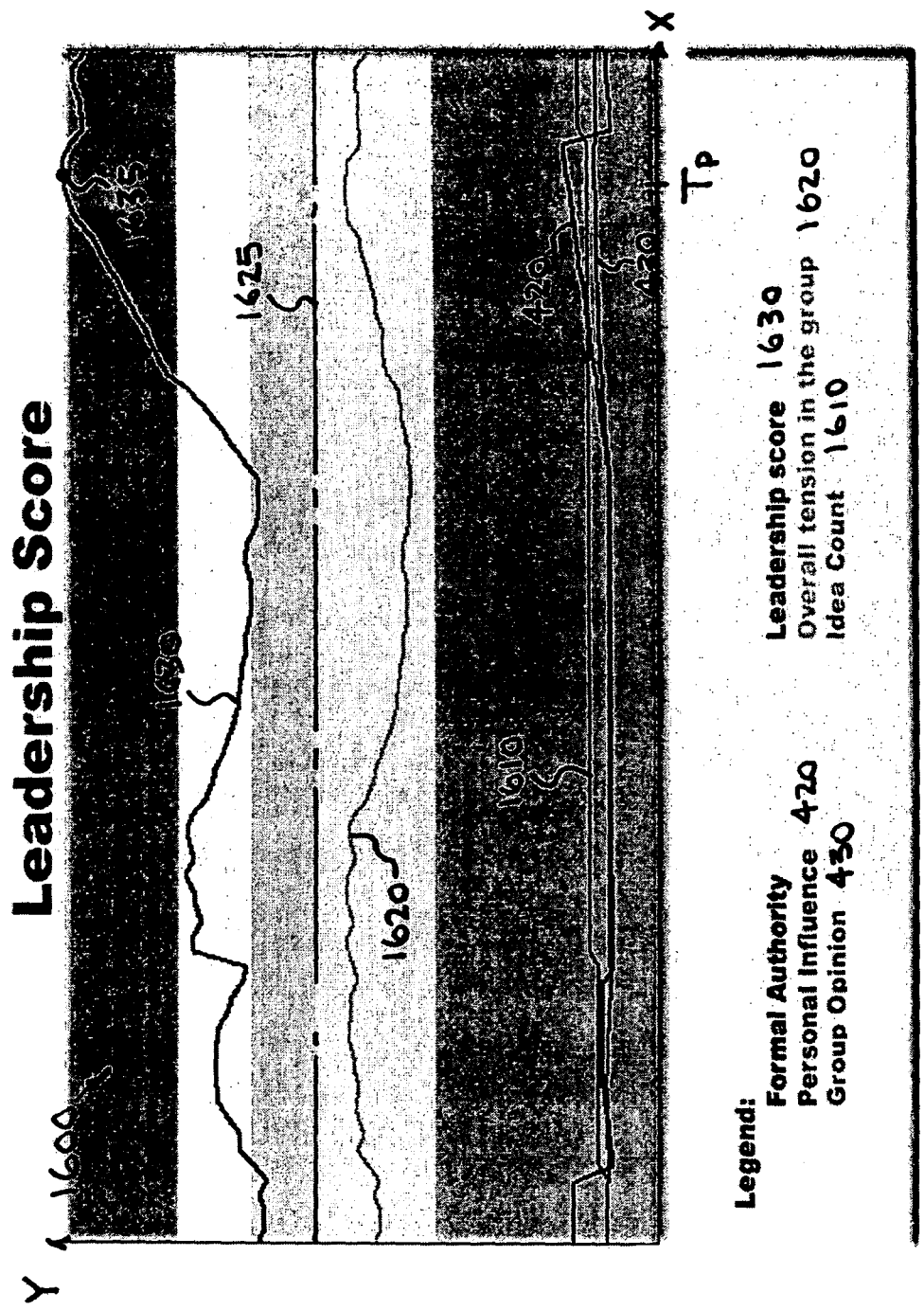
FIG. 16 is a screen shot of an exemplary graph showing the development of a leadership score.

FIG. 16 is a screen shot of an exemplary graph 1600 showing the development of a leadership score. The "X" axis represents time. The "Y" axis represents relative levels of power, tension, ideas introduced, and a combination of these three. For comparison purposes, the gain and loss of personal influence 420 and group opinion 430 that a user has over the course of a virtual meeting are shown. In addition, the number of ideas introduced during a virtual meeting are illustrated in stepped fashion 1610.

The tension efficiency level 1620 of the characters during a virtual meeting is also graphed. Tension efficiency is different than the average overall tension level of the characters (described with respect to FIG. 5) in that it represents how close the overall tension of the characters approaches the optimal level of tension 1625. The optimal level of tension is when the tension level of all of the characters are in the productive zone at the same time. In other words, if each character has a tension level in the productive zone, then the tension efficiency approaches or equals the optimal level of tension 1625.

Curve 1630 represents the addition of the curves for the tension efficiency level 1620, number of ideas introduced during a virtual meeting 1610, and the user character's power 420, 430. The time at point 1635 (at time "Tp") on curve 1630 is the preferred time for a user character to lead (e.g., work toward having ideas passed) because it is at this time when the user character has combined the most power, with the best level of tension, and has the most ideas on the table.

FIG. 17 is a screen shot of an exemplary story-line continuation of a virtual meeting reflecting the results of a meeting based on ideas that were passed. As noted above, the three goals of the organization are financial impact (e.g., return on investment or profits), customer satisfaction, and employee satisfaction. Additional or different goals can be included.

Each idea has points associated with it, either positive or negative (e.g., from −5 to +5). For example, passing the idea "put budget away," in other words cutting expenses, may have a point value of +1 associated with it for financial impact (you spend less money so you have more money to spend, however, it does not rate a +5 because you did not actually make more money); it may have a point value of 0 for customer satisfaction (customers will not likely be more or less satisfied because expenses have been cut); and it may have a point value of −3 for employee moral (the employees may have to do more work with less resources.) At the end of a meeting, the points associated with each idea that passed are added to give a total point value for each of the organizations goals. An exemplary table showing the evaluation of passed ideas with respect to the goals of the organization is as follows:

TABLE 1

|  | Goal No. 1 | Goal No. 2 | Goal No. 3 |
|---|---|---|---|
| Idea No. 1 | +1 | 0 | −3 |
| Idea No. 2 | 0 | −1 | −5 |
| Idea No. 3 | +5 | −1 | −2 |
| Total | +6 | −2 | −10 |

In Table 1, based on the point values associated with Idea Nos. 1, 2, and 3, Goal No. 1 receives a total of +6 points, Goal No. 2 receives a total of −2 points, and Goal No. 3 receives a total of −10 points. The results are identified as either low, medium, or high. For example a low score may be a total value that lies in the range of −15 to −5, a medium score may be a total value that lies in the range of −4 to +4, and a high score may be a total value of that lies in the range of +5 to +15. For the above example, Goal No. 1 would be considered to have received a high score, Goal No. 2 would be considered to have received a medium score, and Goal No. 3 would be considered to have received a low score. Each range of scores under each goal is associated with a statement that reflects the level of the score obtained for that goal. The combination of the statements associated with each goal form a story-line continuation which is intended to assist the user in evaluating how he performed during a virtual meeting.

In FIG. 17 the user received what may be considered a low score for the corporate goal "financial impact," a medium score for the corporate goal "customer satisfaction," and a low score for the corporate goal "employee satisfaction." After reviewing this story-line continuation, the user may desire to run through the virtual meeting again in an effort to receive better results. In order to obtain better results the user may have to employ more creative leadership skills, for example, by raising the tension in the meeting to pass ideas that are more beneficial to the company, focus on ideas having greater impact on the corporation as opposed to extraneous ideas, support animated characters that can help the user pass ideas that the user deems important to pass, etc.

Figure 18:
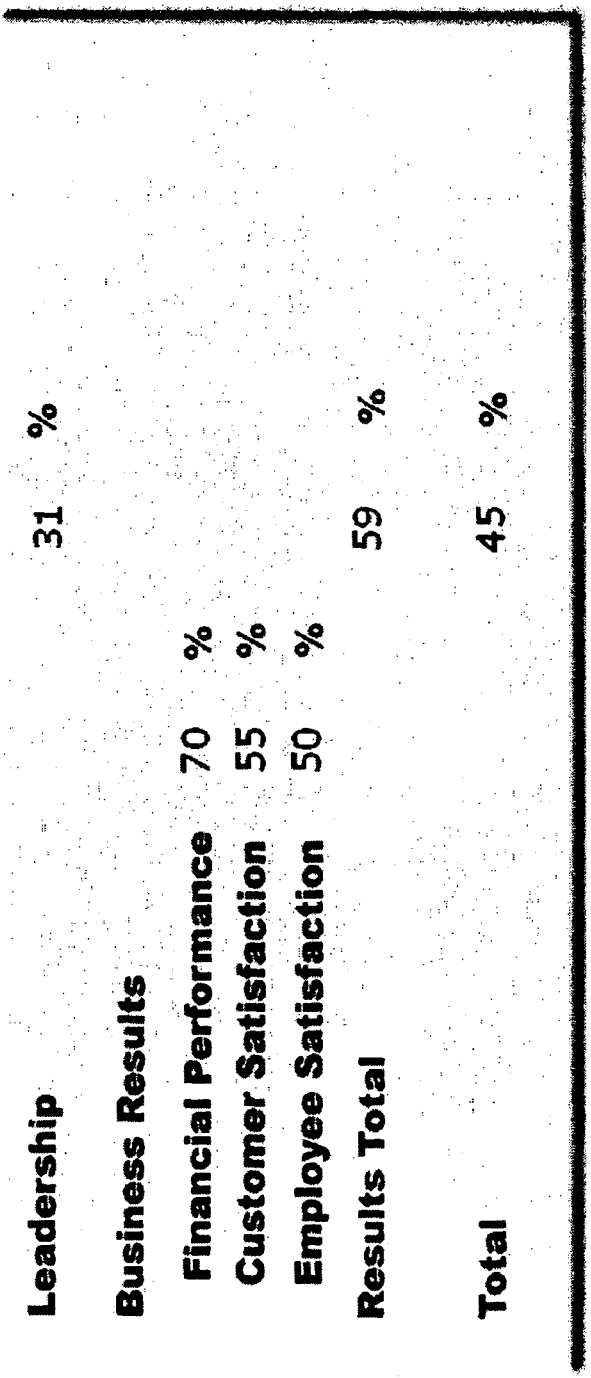
FIG. 18 is a screen shot of an exemplary quantitative assessment of the performance of a user character.

FIG. 18 is a screen shot of an exemplary quantitative assessment of the performance of a user character 1800. The "leadership" score (31%) represents the highest point 1635 on curve 1630 at time "Tp" (FIG. 16). Ideally, a user character tries to acquire as large a number as possible during a virtual meeting and then work toward passing ideas at time "Tp". A user character will acquire a feel for accomplishing this by repetitive use of the system. The "business results" (financial performance 70%, customer satisfaction 55%, and employee satisfaction 50%) are percentage representations of the values obtained to develop a story-line continuation of a virtual meeting. The average of those percentages (59%) is averaged with the leadership score to provide a "total" leadership score (45%) for the user character.

It is clear from the foregoing that the disclosed computer-based learning system provides an advancement in the art of educating individuals in leadership skills. The system enables users to interact in virtual meetings that replicate realistic challenges that they may encounter in their day-to-day activities. In addition, during virtual meetings users interact with animated characters that are guided by an advanced artificial intelligence system and physics system, which provide real-time feedback to the user. Further, users are provided additional meaningful feedback on their performance in the form of metrics. Furthermore, users have the ability to re-play virtual meetings so that they may practice and improve their leadership skills.

While the invention has been described with respect to various specific embodiments, those skilled in the art will readily appreciate that various modifications may be made thereto without departing from the spirit or scope of the invention as defined by the appended claims.

What is claimed is:

1. A computer interface on a computer display, comprising:
   (i) a meeting scene including one or more animated characters displayed on a monitor of a computer, the one or more animated characters rendered dynamically in real time by a physics system in response, at least in part, to data received from a micro-strategy system comprising rules within an artificial intelligence system;
   (ii) a first progressive opinion bar expanding from a position of about no support to a position of about full support, said first progressive opinion bar associated with each of the one or more animated characters enabling a system user to input data indicative of support or opposition for each respective animated character, such inputted data resulting in a gesture from a character representative of the system user that conforms with the inputted data and is utilized by the micro-strategy system and physics system so that the one or more animated characters are rendered dynamically in real time in conformance with the inputted data;

(iii) one or more idea windows displayed in the meeting scene, each idea window including an idea for consideration by the system user and the one or more animated characters, the position of each idea window indicative of a status of each respective idea;

(iv) a second progressive opinion bar expanding from a position of about no support to a position of about full support, said second progressive opinion bar associated with each of the one or more idea windows enabling the system user to input data indicative of support or opposition for each respective idea, such inputted data resulting in a gesture from the character representative of the system user that conforms with the inputted data and is utilized by the micro-strategy system and physics system so that the one or more animated characters are rendered dynamically in real time in conformance with the inputted data; and (v) a progress bar associated with each of the one or more idea windows depicting the degree to which each idea is accepted by the user and the animated characters.

2. A computer interface as recited in claim 1, wherein the physics system includes a dialogue system and an animation system to dynamically render and animate the one or more animated characters in response to data received from the micro-strategy system in real time.

3. A computer interface as recited in claim 1, wherein the micro-strategy system is configured to received input from the system user and signals based on gestures made by the animated characters, and the physics system is configured to animate each animated character in response signals received from the micro-strategy system which send signals to the animated characters to respond.

4. A computer interface as recited in claim 3, wherein the dynamically rendered gestures made by the animated characters include dialogue gestures and physical gestures in real time.

5. A computer interface as recited in claim 1, wherein an idea is under consideration when it is positioned in the lower central portion of the meeting scene.

6. A computer interface as recited in claim 1, wherein said first progressive opinion bars associated with the one or more animated characters include a first portion for inputting opposition to an animated character and a second portion for inputting support for the animated character and a third portion to input neutrality.

7. A computer interface as recited in claim 1, wherein said second progressive opinion bar associated with the one or more idea windows include a first portion for inputting data indicating opposition to an idea and a second portion for inputting data indicating support for the idea and a third portion for inputting neutrality for the idea.

* * * * *